(12) United States Patent
Yoo et al.

(10) Patent No.: US 10,223,956 B2
(45) Date of Patent: Mar. 5, 2019

(54) ELECTRONIC APPARATUS, DISTANCE MEASUREMENT SENSOR AND CONTROL METHOD FOR ELECTRONIC APPARATUS AND DISTANCE MEASUREMENT SENSOR

(71) Applicant: Samsung Electronics Co., Ltd., Suwon-si (KR)

(72) Inventors: Ho-june Yoo, Seoul (KR); Kyung-hoon Lee, Seoul (KR); Nak-won Choi, Gwangmyeong-si (KR); Sang-on Choi, Suwon-si (KR); Kun-sok Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/352,123

(22) Filed: Nov. 15, 2016

(65) Prior Publication Data

US 2017/0148376 A1 May 25, 2017

(30) Foreign Application Priority Data

Nov. 24, 2015 (KR) .................. 10-2015-0164720

(51) Int. Cl.
*G06F 3/03* (2006.01)
*G09G 3/20* (2006.01)
(Continued)

(52) U.S. Cl.
CPC ......... *G09G 3/2092* (2013.01); *G06F 3/0325* (2013.01); *G09G 3/20* (2013.01);
(Continued)

(58) Field of Classification Search
None
See application file for complete search history.

(56) References Cited

U.S. PATENT DOCUMENTS

2001/0021011 A1* 9/2001 Ono .................. G06T 7/586
356/3
2008/0018879 A1 1/2008 Kim et al.
(Continued)

FOREIGN PATENT DOCUMENTS

EP    1 126 412 A2    8/2001
EP    2 693 332 A1    2/2014
(Continued)

OTHER PUBLICATIONS

Xin, Advertising Magic Mirror Display, downloaded @ https://www.youtube.com/watch?v=VROPd-sQ_7s, published on May 15, 2013.*

(Continued)

*Primary Examiner* — Yingchun He
(74) *Attorney, Agent, or Firm* — Staas & Halsey LLP

(57) ABSTRACT

An electronic apparatus is provided, which includes a display, a sensor including first and second light emitters which respectively emit first and second light, and a first light receiver which receives light reflected against an object positioned in front of the display, and a processor electrically connected with the display and the sensor and controlling the display based on a distance from the object calculated according to a time period that one of the first and second light is reflected against the object and returned, in which the processor drives the first light emitter and second light emitter such that the first light emitter and second light emitter emit at least a portion of the first and second light to different illumination regions.

17 Claims, 17 Drawing Sheets

(51) Int. Cl.
*G09G 5/02* (2006.01)
*G09G 5/373* (2006.01)
*G09G 5/38* (2006.01)
*G09G 5/00* (2006.01)

(52) U.S. Cl.
CPC ......... *G09G 5/003* (2013.01); *G09G 2320/06* (2013.01); *G09G 2340/0407* (2013.01); *G09G 2354/00* (2013.01); *G09G 2360/14* (2013.01)

(56) References Cited

U.S. PATENT DOCUMENTS

| | | |
|---|---|---|
| 2010/0046802 A1 | 2/2010 | Watanabe et al. |
| 2011/0051119 A1 | 3/2011 | Min et al. |
| 2012/0194650 A1 | 8/2012 | Izadi et al. |
| 2013/0107005 A1* | 5/2013 | Lim .................. H04N 5/33 348/46 |
| 2014/0035850 A1 | 2/2014 | Shin et al. |
| 2014/0204023 A1 | 7/2014 | Kumar et al. |
| 2014/0327903 A1 | 11/2014 | Mase et al. |
| 2015/0163474 A1 | 6/2015 | You et al. |
| 2015/0276302 A1 | 10/2015 | Roh et al. |
| 2015/0355332 A1* | 12/2015 | Jeong ................. G01B 11/24 345/419 |

FOREIGN PATENT DOCUMENTS

| | | |
|---|---|---|
| EP | 2 927 628 A1 | 10/2015 |
| JP | 2010-71976 | 4/2010 |
| JP | 2011-53216 | 3/2011 |
| KR | 10-2014-0111639 | 9/2014 |
| KR | 10-2015-0001381 | 1/2015 |
| KR | 10-2015-0065473 | 6/2015 |
| WO | 2014/109504 | 7/2014 |

OTHER PUBLICATIONS

"Sadi Product Design Graduation Exhibition", published Nov. 2013.*
International Search Report and Written Opinion of the International Searching Authority dated Feb. 23, 2017 in International Patent Application No. PCT/KR2016/013493.
Extended European Search Report dated Mar. 23, 2018, in corresponding European Patent Application No. 16868856.2, 10 pgs.
European Patent Office issued Examination Report (Communication pursuant to Article 94(3) EPC) in European Patent Application No. 16868856.2 dated Dec. 20, 2018 (8 pages).

* cited by examiner

ELECTRONIC APPARATUS, DISTANCE MEASUREMENT SENSOR AND CONTROL METHOD FOR ELECTRONIC APPARATUS AND DISTANCE MEASUREMENT SENSOR

CROSS-REFERENCE TO RELATED APPLICATIONS

This application claims priority from Korean Patent Application No. 10-2015-0164720, filed on Nov. 24, 2015 in the Korean Intellectual Property Office, the disclosure of which is incorporated herein by reference in its entirety.

BACKGROUND

1. Field

Apparatuses, sensors, and methods consistent with what is disclosed herein relate to an electronic apparatus, a distance measurement sensor and a control method for the electronic apparatus and the distance measurement sensor, and more specifically, to an electronic apparatus configured to control a display according to a distance from a user, a distance measurement sensor and a control method thereof.

2. Description of the Related Art

A display apparatus is becoming an ultimate mediator to deliver information to humans and it has shown a fast growth since the development of an early cathode ray tube (CRT) type monochrome display apparatus that occupied a considerable volume to the development of a recent ultra-thin, wide-screen type full color display apparatus.

Development of such display apparatus is accelerated to move from a display apparatus that only outputs characters and images to a display apparatus that outputs more sophisticated and beautiful images.

The display apparatus is configured in a distinctive shape such that problems may occur. That is, space utilization is difficult because the display apparatus occupies much space in homes or public places where it is installed, aesthetic impression of space may deteriorate because it may be seen as a visual obstacle, and utilization of the display apparatus is limited due to the deteriorating aesthetic impression.

However, the above problems are being solved recently by using a transparent display or a mirror display apparatus, and these displays are applied to an advertising board or a refrigerator door, thus sensing a user approaching, and providing various information or serving as a refrigerator door capable of displaying a mirror or items therein.

In order to enhance accuracy of sensing a user approaching, demand for efficient arrangement and driving of a sensor for sensing a user approaching is increased.

SUMMARY

Additional aspects and/or advantages will be set forth in part in the description which follows and, in part, will be apparent from the description, or may be learned by practice of the embodiments.

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an embodiment, a technical objective is to provide an electronic apparatus which measures a distance from a user by efficiently driving a plurality of lights without incurring interferences, and controls a display based on the measured distance, a distance measurement sensor and a control method for the electronic apparatus and the distance measurement sensor.

According to an embodiment, the electronic apparatus includes a display, a sensor including first light emitter and second light emitter configured to respectively emit first light and second light, and a first light receiver configured to receive a light reflected against an object positioned in front of the display, and a processor electrically connected with the display and the sensor, and configured to control the display based on a distance from the object which is calculated according to a time that one of the first and second light is reflected against the object and returned. The processor may drive the first light emitter and second light emitter such that the first light emitter and second light emitter emit at least a portion of the first and second light in different illumination regions.

According to an embodiment, the first light emitter and second light emitter may differently drive at least one of a light emitting time, a light emitting frequency, and a light emitting wavelength.

According to an embodiment, the light receiver may be disposed between the first light emitter and second light emitter, and the processor may drive the first light emitter and second light emitter such that the first light emitter and second light emitter sequentially emit a light at different light emitting timings.

According to an embodiment, the light receiver may be disposed between the first light emitter and second light emitter, and the processor may drive the first light emitter and second light emitter such that the first light emitter and second light emitter emit a light of different frequencies.

According to an embodiment, the sensor may further include a second light receiver. The first light emitter and second light emitter may emit a light of different wavelengths, and the first and second light receivers may respectively receive a reflected light of different wavelengths in which the reflected light of different wavelengths is a light of different wavelengths that is reflected against the object.

According to an embodiment, at least one of an illumination angle of a light of the first light emitter and second light emitter, and a light emitting distance of a light emitted from the first light emitter and second light emitter may be different.

According to an embodiment, the first light emitter and second light emitter may have different light illumination directions.

According to an embodiment, the display may include a transparent display panel, and the processor may control a transparency of at least one region of the transparent display to be varied, when a distance between the sensor and the object is determined to be close by less than a preset distance while contents is being displayed on the transparent display.

According to an embodiment, the display may include a mirror display panel, and the processor may control at least one of a size and a position of the contents displayed on the mirror display to be varied and displayed, when a distance between the sensor and the object is determined to be close by less than a preset distance while contents is being displayed on the mirror display.

According to an embodiment, the electronic apparatus includes a display, a sensor including a light emitter to emit a light and a light receiver to receive a light reflected against an object positioned in front of the display, and configured to sense a distance from the object by measuring a time that the light is reflected against the object and returned, and a processor electrically connected with the display and the sensor and configured to control the display based the sensed distance from the object. The processor may sequentially drive the sensor and determine a time section in which a distance out of a preset distance range is measured, and determine a driving period of the sensor based on the measured time section.

According to an embodiment, a control method of an electronic apparatus provided with a sensor including first light emitter and second light emitter to respectively emit first light and second light, and a first light receiver to receive a light reflected against an object positioned in front is provided, which may include operations of driving the first light emitter and second light emitter such that the first light emitter and second light emitter emit at least a portion of the first light and second light in different illumination regions, sensing a distance from the object by measuring a time that at least a portion of the first and second light is reflected against the object and returned, and controlling a display based on the sensed distance from the object.

According to an embodiment, the operation of driving the first light emitter and second light emitter may include driving the first light emitter and second light emitter such that at least one of a light emitting time, a light emitting frequency, and a light emitting wavelength is different.

According to an embodiment, the operation of driving the first light emitter and second light emitter may include driving the first light emitter and second light emitter such that the first light emitter and second light emitter sequentially emit a light at different light emitting timings.

According to an embodiment, the operation of driving the first light emitter and second light emitter may include driving the first light emitter and second light emitter such that the first light emitter and second light emitter emit a light in different frequencies.

According to an embodiment, the sensor may further include a second light receiver, and the first light emitter and second light emitter may emit a light of different wavelengths. The first and second light receivers may respectively receive a reflected light of different wavelengths in which the reflected light of different wavelengths is a light of different wavelengths that is reflected against the object.

According to an embodiment, at least one of a light illumination angle of the first and second light emitter, a light emitting direction and an illumination distance of a light emitted from the first and second light emitter may be different.

According to an embodiment, the display may include a transparent display panel, and the control method may further include an operation of controlling a transparency of at least one region of the transparent display to be varied, when a distance between the sensor and the object is determined to be close by less than a preset distance while contents is being displayed on the transparent display.

According to an embodiment, the display may include a mirror display panel, and the control method may further include an operation of changing at least one of a size and a position of the contents displayed on the mirror display and displaying the same, when a distance between the sensor and the object is determined to be close by less than a preset distance while contents is being displayed on the mirror display.

According to an embodiment, a control method of an electronic apparatus which measures a distance from an object positioned in front by using a sensor is provided, and may include operations of sensing a distance from the object by driving the sensor, comparing whether the sensed distance from the object at each time section is included within a preset distance range, and when the measured distance at a specific time section is out of the preset distance range, setting a driving period such that the sensor is driven except for the time section in which the distance out of the preset distance range is sensed.

According to an embodiment, the distance measurement sensor includes a first light emitter to emit a first light, a second light emitter to emit a second light, a light receiver to receive a light reflected against an object positioned in front of a display, and a micro controller to calculate a distance from the object by measuring a time that a light emitted from at least one of the first light emitter and second light emitter is reflected against the object and returned. The micro controller may be driven the first light emitter and second light emitter such that the first light emitter and second light emitter emit at least a portion of the first light and second light in different illumination regions.

According to an embodiment, a non-transitory computer readable recording medium is provided, storing a program implementing a control method of an electronic apparatus provided with a sensor including first light emitter and second light emitter to respectively emit first light and second light, and a first light receiver to receive a light reflected against an object positioned in front of the display. The control method may include operations of driving the first light emitter and second light emitter such that the first light can be emitted to a first illumination region and the second light can be emitted to a second illumination region of which at least a portion is different from the first illumination region, sensing a distance from the object by measuring a time that at least one of the first light and second light is reflected against the object and returned, and controlling a display based on the sensed distance from the object.

According to the above embodiments, the electronic apparatus can measure a distance from a user by receiving a plurality of lights emitted from the sensor without interference, and efficiently control the display based on such measurement.

According to an embodiment, a non-transitory computer readable storage medium storing a control method for an electronic apparatus provided with a sensor comprising first light emitter and a second light emitter to respectively emit first light and second light, and a first light receiver to receive a light reflected against an object positioned in front of the apparatus, the control method including: driving the first light emitter and the second light emitter where the first light emitter and second light emitter emit at least corresponding portions of the first light and the second light into different illumination regions; determining a distance from the object by measuring a time that at least reflected portions of the first light and second light are reflected against the object and returned; and controlling a display based on the distance from the object.

According to an embodiment, a method, including: emitting non-interfering light from two different points toward an object covering two different illumination regions toward the object; detecting whether the non-interfering light is reflected from the object; determining a distance from the object responsive to a time off flight when the non-interfering light flies from the two different points to and is reflected from the object; and controlling, when the distance is calculated, a transparency of a display responsive to the distance.

According to an embodiment, a method, including: emitting non-interfering light from two different points toward an object covering two different illumination regions toward the object; detecting whether the non-interfering light is reflected from the object; determining a distance from the object responsive to a time off flight when the non-interfering light flies from the two different points to and is reflected from the object; controlling, when the distance is calculated, a transparency of a display responsive to the distance; and displaying information about an item located behind the display corresponding to a position of a selection by a user on the display.

The selection may be a touch.

According to an embodiment, a method including: emitting non-interfering light from two different points toward an object covering two different illumination regions toward the object; detecting whether the non-interfering light is reflected from the object; determining a distance from the object responsive to a time off flight when the non-interfering light flies from the two different points to and is reflected from the object; and controlling, when the distance is calculated, a position of contents on a display responsive to the distance.

The display may be a reflective display and the method comprises controlling the position of the contents responsive to user position of a user in front of the reflective display.

The method may include displaying information about an item of the contents of the display corresponding to a position of a selection by a user on the display.

The selection may be a touch.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION

Figures 1A, 1B:
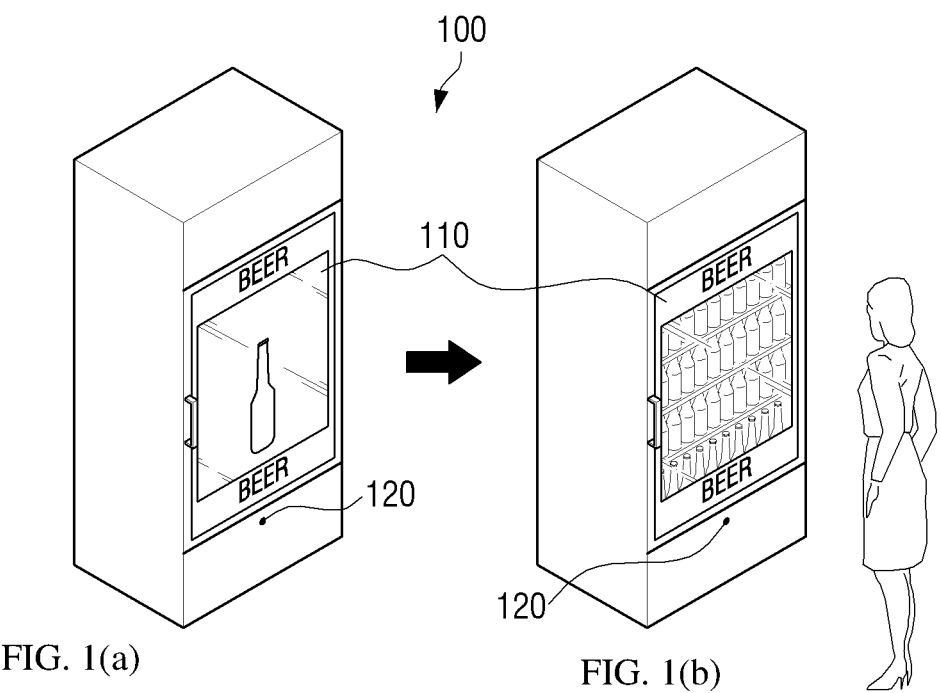
FIG. 1, including (a) and (b), is a diagram explaining operation of an electronic apparatus according to an embodiment.

Reference will now be made in detail to the embodiments, examples of which are illustrated in the accompanying drawings, wherein like reference numerals refer to the like elements throughout. The embodiments are described below by referring to the figures.

Certain exemplary embodiments of the present inventive concept will now be described in greater detail with reference to the accompanying drawings. However, this is not intended to limit the technology disclosed herein to any specific embodiments, but should be understood as encompassing a variety of modifications, equivalents, and/or alternatives of the embodiment. For the description of the drawings, the same drawing reference numerals are used for the same elements even in different drawings.

The expression such as "have," "may have," "comprise," or "may comprise," and so on as used herein refer to the existence of a corresponding characteristic (e.g., element such as number, function, operation, or part), and not intended to foreclose the existence of additional characteristic.

The expression such as "A or B," "at least one of A or/and B," or "one or more of A or/and B," and so on as used herein may include all the possible combination of the items listed together. For example, "A or B," "at least one of A and B," or "at least one of A or B" may refer to all of: (1) including at least one A; (2) including at least one B, or (3) including all of at least one A and at least one B.

The expression such as "first," "second," and so on as used herein may modify a variety of elements without being limited by order and/or importance thereof, and is used solely for the purpose of distinguishing one element from another and not intended to limit the corresponding element. For example, a first user device and a second user device may represent different user devices from each other, regardless of the order or importance thereof. For example, without departing from the scope of the present disclosure, the "first element" may be named the "second element," and similarly, the "second element" may be named the "first name."

When a certain element (e.g., first element) is stated as being operatively or communicatively coupled with/to, or connected to another element (e.g., second element), it is to be understood that the certain element may be directly coupled with another element, or connected via yet another element (e.g., third element). On the contrary, when a certain element (e.g., first element) is stated as being "directly coupled" or "directly connected" to another element (e.g., second element), it may be understood that the certain element and another element are not intervene by yet another element (e.g., third element) present therebetween.

Depending on circumstances, the expression "configured to" as used herein may be exchangeably used with "suitable for," "having the capacity to," "designed to," "adapted to," "made to," or "capable of." The term "configured to" may not necessarily mean "specifically designed to." Instead, in certain circumstance, the expression "apparatus configured to" may be intended to mean that the apparatus "is capable of" in cooperation with another apparatus or parts. For example, a phrase "processor configured to perform A, B and C" may be intended to mean a "generic-purpose process (e.g., CPU or application processor (AP)) that is capable of performing corresponding operations by executing a devoted processor (e.g., embedded processor) to perform the corresponding operation, or one or more software programs stored on a memory device.

The terms used herein are used for the purpose of describing a specific embodiment, and may not be intended to limit a scope of another embodiment. Unless otherwise specifically mentioned, a singular expression may encompass a plural expression. The terms used herein, including technical or scientific terms, may have the same meanings as generally understood by those skilled in the art. Among the terms used herein, the terms that are generally defined in the dictionary may be interpreted as having the same or similar meaning in the context of the associated technology, and unless otherwise specifically defined, these are not interpreted in an ideal or excessively formal meaning. Depending on circumstances, even the term defined herein cannot be interpreted as foreclosing the embodiments of the present disclosure.

An electronic apparatus according to various embodiments may include at least one of a smart phone, a tablet personal computer (PC), a mobile phone, a video phone, an e-book reader, a desktop personal computer (PC), a laptop personal computer (PC), a netbook computer, a workstation, a server, a personal digital assistant (PDA), a portable multimedia player (PMP), an MP3 player, a mobile medical device, a camera, or a wearable device, for example.

According to an embodiment, an electronic apparatus may be a home appliance. The home appliance may include at least one of a television, a digital video disk (DVD) player, an audio, a refrigerator, an air-conditioner, a cleaning machine, an oven, a microwave, a laundry machine, an air cleaner, a set-top box, a home automation control panel, a security control panel, a TV box (e.g., Samsung HomeSync™, AppleTV™, GoogleTV™), a game console (e.g., Xbox™, PlayStation™), an electronic dictionary, an electronic key, a camcorder, or an electronic frame, for example.

According to another embodiment, an electronic apparatus may include at least one of various medical devices (e.g., various portable medical measurement devices (e.g., blood glucose monitoring device, heart rate monitoring device, blood pressure monitoring device, temperature monitoring device), magnetic resonance angiography (MRA), magnetic resonance imaging (MRI), computed tomography (CT), photographing device, ultrasound device, and so on), a navigation device, a global navigation satellite system (GNSS), an event data recorder (EDR), a flight data recorder (FDR), a car infotainment device, a ship electronic device (e.g., ship navigation device, gyro compass, and so on), an avionics, a security device, a car head unit, an industrial or home robot, an automatic teller's machine of a finance institution, a point of sales (POS) of a shop, or an internet of things (e.g., bulb, various sensors, electrical or gas meter, sprinkler device, fire alarm, thermostat, streetlight, toaster, exercising machine, hot water tank, heater, boiler, and so on).

According to an embodiment, an electronic apparatus may include at least one of a portion of furniture or building/construction, an electronic board, an electronic signature receiving device, a projector, or various measurement devices (e.g., water, electricity, gas, or signal metering devices). In various embodiments, an electronic apparatus may be a combination of one or more among the above described various apparatuses.

An electronic apparatus according to an embodiment may be a flexible electronic device. Further, an electronic apparatus according to an embodiment may not be limited to the above described apparatuses and may include a new electronic apparatus according to the technological development.

Referring to the attached drawings, the invention will be described in detail below.

FIG. 1, including (a) and (b), is a diagram explaining operation of an electronic apparatus 100 according to an embodiment.

Referring to FIG. 1, the electronic apparatus 100 may be implemented to be devices with a display 110 for various purposes. For example, the electronic apparatus 100 may be implemented to be a mobile phone, a smart phone, a laptop computer, a tablet device, an electronic book device, a digital broadcasting device, a PDA, a PMP, a navigation, a refrigerator, a digital signage, or a wearable device such as a smart watch, smart glasses, head-mounted display (HMD), and so on, although not limited hereto. Based on an assumption that the electronic apparatus 100 is a refrigerator equipped with a large type display 110, an embodiment will be described below.

According to various embodiments, the electronic apparatus 100 may control the display 110 in response to movement of an object sensed at the front of the display 110. The display 110 may be implemented to be a transparent display or a mirror display, although not limited thereto. The display 110 may be mounted on a door that opens and closes a refrigerator and may display contents corresponding to a direction in which a user views the door from outside the refrigerator.

The electronic apparatus 100 may sense the movement of an object by using a sensor 120 (e.g., sensor of infrared ray (IR) time of flight (ToF) method). The electronic apparatus 100 may detect whether an object approaches to an electronic apparatus 100 by using the sensor 120, adjust a transparency of the display 110, adjust a size and a position of the contents displayed on the display 110, or adjust a size and a position of the contents while adjusting a transparency.

Referring to FIG. 1(a), the electronic apparatus 100 may display various contents such as advertisement contents regarding a specific product on the display 110. In this case, the electronic apparatus 100 may always display contents on the display 110, or display contents when a preset condition is met. For example, the electronic apparatus 100 may display contents when an object such as human approaches the front of the electronic apparatus 100, or display contents when there is no object such as human in front of the electronic apparatus 100. Further, contents may be displayed regardless of whether an object is present in front of the electronic apparatus 100.

Referring to FIG. 1(b), the electronic apparatus 100 may adjust a transparency of the display 110 based on an approaching distance of an object. The electronic apparatus 100 may sense how close an object approaches toward the front of the electronic apparatus 100 by using the sensor 120. When an object comes nearer within a preset distance, the electronic apparatus 100 may control a transparency of at least a portion of a region of the display 110 to increase. Herein, at least a portion of a region may be a preset region in the electronic apparatus 100; however, depending on embodiments, it may be a region corresponding to a position where a user is approaching.

For example, when a user approaches to take out an item kept in a refrigerator, the electronic apparatus 100 may increase a transparency of the display 110 so that a user can confirm an item inside the refrigerator. In this case, the displayed contents may be disappeared with increasing transparency, a size and a position of the displayed contents may be modified with increasing transparency, or display state of the displayed contents may be maintained while transparency is increasing.

As described above, the electronic apparatus 100 can enhance user convenience by properly modifying display state to be suitable for situation.

Figure 2:
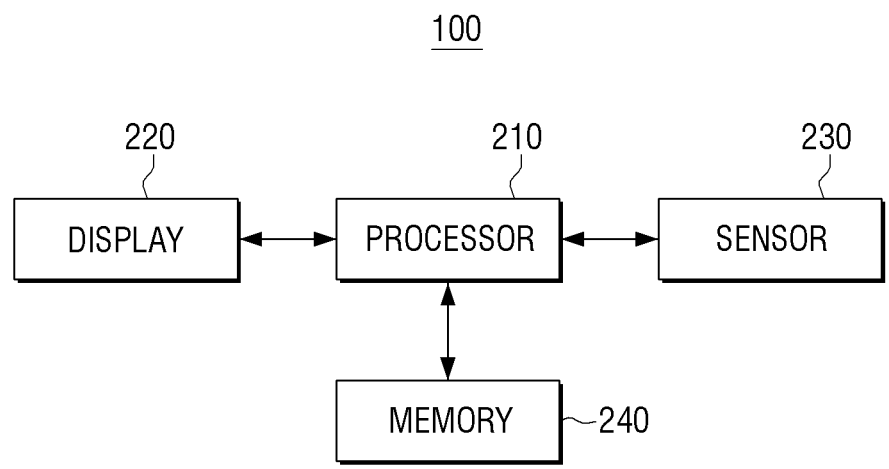
FIG. 2 is a block diagram briefly illustrating constitution of an electronic apparatus according to an embodiment.

FIG. 2 is a block diagram briefly illustrating constitution of the electronic apparatus according to an embodiment.

Referring to FIG. 2, the electronic apparatus 100 may include a processor 210, the display 220, the sensor 230, and a memory 240.

The display 220 may display various contents such as texts, images, video or icons. The display 220 may include a display panel and a driver. The display panel may be implemented to be a transparent display panel, a mirror display panel, or an OLED display panel, but not limited hereto.

When the display 220 includes a transparent display panel, the display 220 may display contents in nontransparent state or display contents in transparent state. In the latter's case, a user may view an object positioned on a back side of the display 220 together with the displayed contents. Further, when the display 220 includes a mirror display panel, it may provide a mirror function on the region other than a certain region where the contents of the display 220 is displayed. Thereby, a user may reflect himself or herself through the mirror function region while simultaneously viewing the contents displayed on the certain region of the display. Further, the display 220 may be implemented to be a touch screen by being integrated with a touch pad and receive a user touch input.

The sensor 230 is provided to sense whether an object appears (or approaches) in front of the display 220. For example, the sensor 230 may sense the movement in which a human appears in front of the display 220 and approaches to the display 220. Further, the sensor 230 may transmit the sensed signal to the processor 210. Herein, a signal transmitted to the processor 210 may be in various forms including, a signal including a time of receiving the light reflected against or off an object, a flag signal indicating that an object appears in front of the display 220, or a distance signal indicating a distance of an object shown in front of the display 220. Further, the sensor 230 may transmit a signal including the received time information to the processor 210, and the processor 210 may calculate a distance from an object. Further, the sensor 230 may calculate a distance from an object, and transmit the distance value to the processor 210. Further, the sensor 230 may transmit the flag signal to the processor 210. The processor 210 may control the display 220 based on the received signal as described above. Herein, the sensor 230 may be provided within the electronic apparatus 100, or implemented in such a form that can be attached to or detached from the electronic apparatus 100.

The processor 210 may be provided to control operation of the electronic apparatus 100. The processor 210 may display contents on the display 220 or change display state of the display 220 according to a preset event. For example, the processor 210 may adjust a transparency of the transparent display or activate/inactivate the mirror function of the mirror display. In this case, the processor 210 may display contents based on the signal received from the sensor 230 or change the state of the display 220.

Further, the processor 210 may control the driving state of the sensor 230. According to an embodiment, the processor 210 may control the driving state of a plurality of light emitters provided within the sensor 230 so that at least some of a plurality of lights emitted from the sensor 230 can be emitted to different illumination regions, which will be specifically explained below.

The memory 240 may store instructions to perform the above described operation of the processor 210. For example, when the sensor 230 senses approaching of an object and transmits this to the processor 210, the processor 210 may read and perform instructions to perform a function of adjusting a transparency of the display 220 in response to approaching of an object stored in the memory 240.

FIG. 3, including (a) and (b), is a block diagram regarding constitution of the sensor in the electronic apparatus according to an embodiment.

As illustrated in FIG. 3, while the sensor for recognizing the movement of an object may vary in types, description below will be provided based on an assumption that the sensor is an IR ToF method sensor according to an embodiment.

Figure 3A:
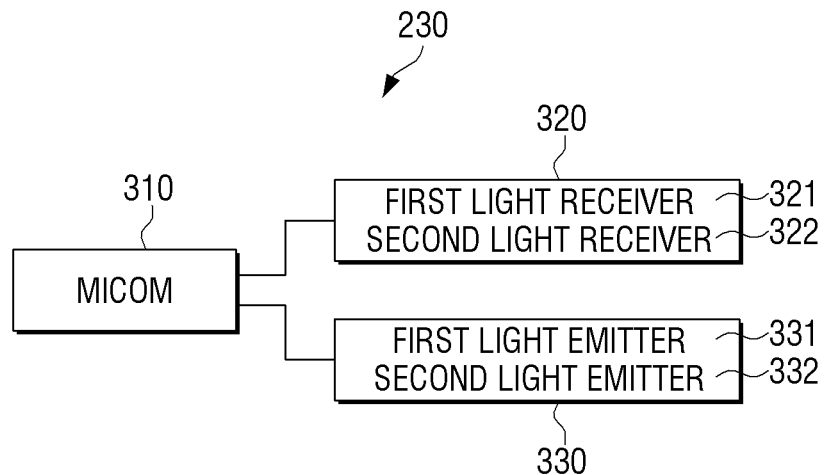
FIG. 3, including (a) and (b), is a block diagram briefly illustrating constitution of a sensor included in an electronic apparatus according to an embodiment.

Referring to FIG. 3(a), the sensor 230 may include a micro controller 310, a light receiver 320, and the light emitter 330.

The micro controller 310 may control the overall operation of the sensor. For example, the micro controller 310 may control the light emitter 330 to emit a light. For example, the micro controller 310 may control driving state of the light emitter 330 such that at least some of a plurality of lights emitted from the light emitter 310 can be emitted to different illumination regions. However, as described above, when the sensor 230 is provided on the electronic apparatus 200, the processor 210 of the electronic apparatus 200 may control driving state of the light emitter 330. The micro controller 310 may control the light receiver 320 to receive a light emitted from the light emitter 330 and then reflected against an object.

The micro controller 310 may measure a distance between the sensor and an object by using the received light reflected from the light receiver 320. For example, the micro controller 310 may calculate a distance by measuring a time duration from a point when a light emitted from the light emitter 330 is reflected against an object to a point when a light is received by the light receiver 320. Specifically, the micro controller 310 may control the light emitter 330 to flicker a light at fast time interval when emitting a light, and control the light receiver 320 to receive a reflected light according to the flickering period. By this operation, the micro controller 310 may calculate a distance from an object by using an accumulated amount of light.

The light emitter 330 may perform a light emitting operation through at least one light emitting device. The light emitter 330 may include, for example, at least one light emitting diode (LED). The light emitter 330 according to an embodiment may include the first light emitter 331 and the second light emitter 332. Herein, the first light emitter 331 and the second light emitter 332 may each include at least one light emitting device (e.g., LED). However, embodiments may not be limited to the examples described above. Accordingly, the light emitter 330 may include three or more light emitters. Meanwhile, a plurality of light emitters 330 may emit a light in various light emitting states.

A light emitting distance and view angle of a light emitted by the light emitter 330 may be determined according to specification of the sensor. For example, a maximum light emitting distance and view angle of a light may be determined according to a type of LED and a photo diode (PD) or according to the magnitude of electrical currents applied to LED. In a following description, a light emitting distance may indicate a distance that can be maintained accurate when the electronic apparatus 200 calculates a distance from an object by using a signal transmitted from the sensor.

The first light emitter 331 and the second light emitter 332 may emit a light at different light emitting timings. Specifically, the first light emitter 331 and the second light emitter 332 may emit a light sequentially. When the first light emitter 331 and the second light emitter 332 emit a light sequentially, the mutual light interference can be reduced.

The first light emitter 331 and the second light emitter 332 may emit a light of different frequencies. When a frequency is set differently, the mutual light interference can be avoided without sequentially driving the first light emitter 331 and the second light emitter 332.

The first light emitter 331 and the second light emitter 332 may emit a light of different wavelengths. When a wavelength is set differently, the mutual light interference can be avoided without requiring the first light emitter 331 and the second light emitter 332 be sequentially driven.

The light receiver 320 may receive a light reflected against an object in front of the sensor.

When the first light emitter 331 and the second light emitter 332 emit a light sequentially, the light receiver 320 may distinguish a light emitted from the first light emitter 331 and a light emitted from the second light emitter 332 among the sequentially received reflected lights. The light receiver 320 may accumulate the received lights and transmit the accumulated data to the micro controller 310.

The light receiver 320 may include a filter that can distinguish lights of different frequencies. When the first light emitter 331 and the second light emitter 332 emit a light of different frequencies, the light receiver 320 may distinguish a light emitted from the first light emitter 331 and a light emitted from the second light emitter 332 among the received reflected lights. However, the light receiver 320 may not be limited to a structure having a filter to distinguish a light. For example, when the light receiver 320 transmits the received light to the micro controller 310, the micro controller 310 may distinguish a light emitted from the first light emitter 331 and a light emitted from the second light emitter 332 by having a filter that can distinguish a light of different frequencies.

When the first light emitter 331 and the second light emitter 332 emit a light of different frequencies, the light receiver 320 may be composed of a plurality of light receivers. For example, the first light receiver 321 may be implemented to be a form corresponding to the first light emitter 331 so as to receive a light emitted from the first light emitter 331 and reflected against an object, and the second light receiver 322 may be implemented to be a form corresponding to the second light emitter 332 so as to receive a light emitted from the second light emitter 332 and reflected against an object.

Figure 3B:
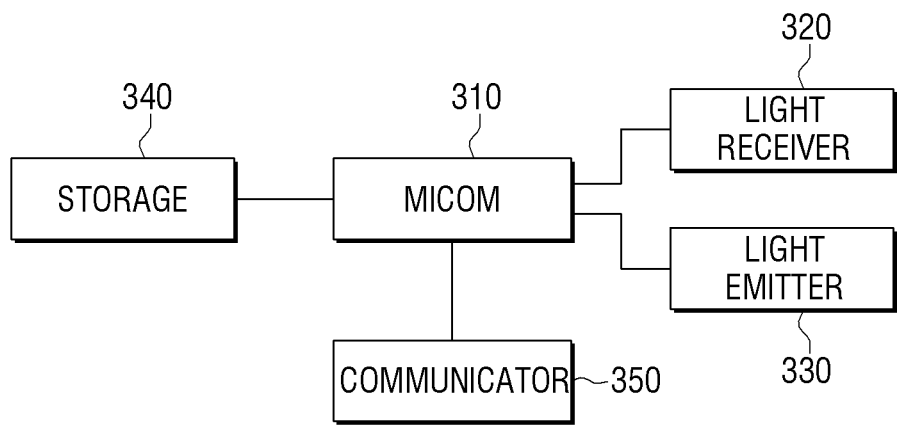

Referring to FIG. 3(b), the sensor 230 of the electronic apparatus 100 may further include a storage 340 and a communicator 350. The micro controller 310, the light receiver 320 and the light emitter 330 are same as in FIG. 3A, which will not be specifically explained below for the sake of brevity.

The storage 340 may store data generated in the sensor 230. For example, the storage 340 may store a distance from an object positioned in front of the sensor and a time during which an object is retained in front of the sensor, and so on, which are calculated by the micro controller 310.

The communicator 350 may transmit the data generated in the sensor 230 to the processor 210 of the electronic apparatus 100. Further, the communicator 350 may receive a command generated in the processor 210 of the electronic apparatus 100. The communicator 350 may perform both the wiry communication and the wireless communication. For example, the communicator 350 may be provided in a USB type and fastened with the electronic apparatus 100. Further, the communicator 350 may perform the communication with the electronic apparatus 100 by using Bluetooth, WiFi, and so on.

The above described constitution of the sensor 230 is merely one of embodiments, and exemplary embodiments may not be limited hereto.

Following will describe various embodiments of disposing the above described sensor on the electronic apparatus and driving the same.

FIG. 4, including (a) and (b), is a diagram explaining situation in which a plurality of light emitters in the electronic apparatus emit a light in a same direction according to an embodiment.

Figures 4A, 4B:
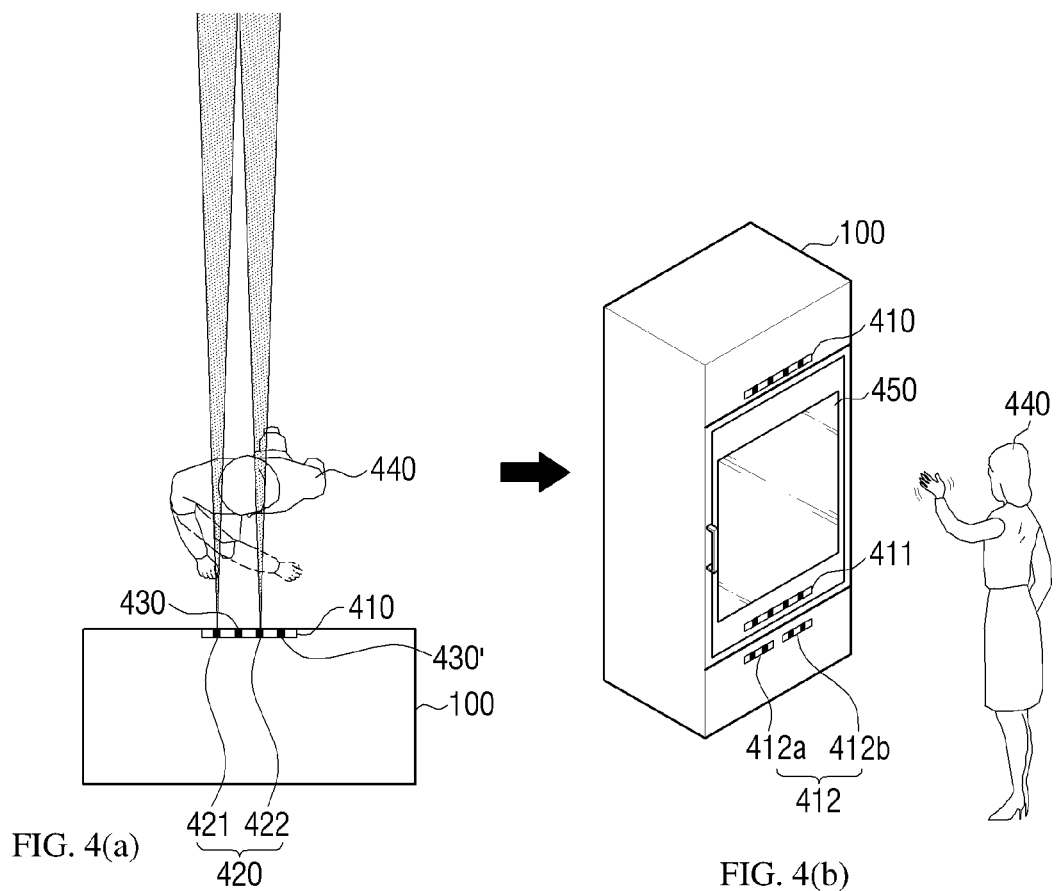
FIG. 4, including (a) and (b), is a diagram illustrating a driving method and arrangement of a sensor included in an electronic apparatus according to an embodiment.

FIG. 4(a) is a diagram in which the electronic apparatus 100 including the sensor 410 is viewed from the above. FIG. 4(b) is a side diagram in which the electronic apparatus 100 including the sensor 410 is viewed from the side.

Referring to FIG. 4(a), the sensor 410 may be disposed on one side of the electronic apparatus 100, and emit a light externally of the electronic apparatus 100. As described with reference to FIG. 3, the sensor 410 may include the light emitter 420 and the light receiver 430. According to an embodiment, the sensor 410 may include a plurality of light emitters 421, 422. A plurality of light emitters 421, 422 may emit a light in a same direction.

When a plurality of light emitters 421, 422 emit a light, the sensor 410 may confirm a position and the movement of an object 440 more correctly. Specifically, as a number of the light emitter 420 increases, a dead zone where a light does not arrive may decrease. Further, because data collecting can be performed by each of a plurality of light emitters 421, 422, the movement of the object 440 may be distinguished more finely.

Referring to FIG. 4(b), the electronic apparatus 100 may dispose the sensor on various positions. For example, the electronic apparatus 100 may dispose the sensor on various positions of the electronic apparatus such as sensor-1 410, sensor-2 411, and sensor-3 412. However, when the electronic apparatus 100 includes only one sensor, the sensor may be disposed on one of the above described positions.

Referring to FIG. 4(b), the sensor 1 410 may be disposed on an upper side of the electronic apparatus 100. In this case, in order to correctly sense approaching of the object 440, the sensor 1 410 may be disposed such that a direction of irradiating a light can be directed toward a lower side by certain angle from a direction toward the front of the electronic apparatus 100.

The sensor 2 411 and the sensor-3 412 which perform a same function as the sensor 1 410 may be disposed on a lower ending portion of the electronic apparatus 100 or an internal region of the display 450. In order to correctly sense approaching of the object 440, the sensor-2 411 and the sensor-3 412 may be disposed such that a direction of irradiating a light can be directed toward an upper side by certain angle from a direction toward the front of the electronic apparatus 100. However, a number and arrangement of the sensors and an illumination direction of the sensor may not be limited hereto and may be implemented variously.

The sensor-1 410 may include a plurality of light emitters 421, 422 and one light receiver 430. The light receiver 430 may be disposed between a plurality of light emitters 421, 422. However, it may not be limited hereto; the light receiver 430 may be provided on a position that can enhance the light receiving performances regardless of positions of a plurality of light emitters 421, 422. Disposing the light receiver 430 between a plurality of light emitters 421, 422 indicates that the light receiver 430 may be positioned on a middle region of the points where a plurality of light emitters 421, 422 are positioned, while also indicating that the light receiver 430 may be positioned on a virtual line connecting a plurality of light emitters 421, 422.

As described above, a plurality of light emitters 421, 422 may emit a light sequentially at a preset interval. In this case, one light receiver 430 may sequentially receive a light emitted sequentially at a preset interval from a plurality of light emitters 421, 422 and reflected against the object 440. Further, a plurality of light emitters 421, 422 may emit a light of different frequencies. In this case, the light receiver 430 may receive a light alternately emitted in different frequencies and reflected against the object 440.

When a plurality of light emitters 421, 422 emit a light in different wavelengths, the sensor 1 410 may further include the light receiver 430'. In this case, a plurality of light emitters 421, 422, the light receiver 430 and the additional light receiver 430' may be paired respectively and operated. The light receiver 430 and the added light receiver 430' may be implemented respectively at a wavelength band corresponding to each wavelength band of a plurality of light emitters 421, 422. For example, the light receiver 430 may receive a light of a first wavelength band emitted from the first light emitter 421 and reflected against the object 440, and the additional light receiver 430' may receive a light of a second frequency band emitted from the second light emitter 422 and reflected against the object 440.

Referring to FIG. 4(b), the sensor-3 412 may include the two sensors 412a, 412b. In this case, each of the sensors 412a, 412b may emit a light of different wavelengths and receive a light reflected against the object 440.

As described above, when a plurality of light emitters 421, 422 or a plurality of sensors 412a, 412b are disposed to detect installing/uninstalling of the object 440, the movement of the object 440, or an approaching distance of the object 440, the light interference may occur. However, according to the embodiments, in order to enhance the accuracy of detecting the object 440 while minimizing the light interference, a light may be sequentially emitted, a frequency of a light may be differentiated, or a wavelength of a light may be differentiated for the driving, which are briefly explained above. Following will specifically explain the above described methods of minimizing the light interference.

Figure 5:
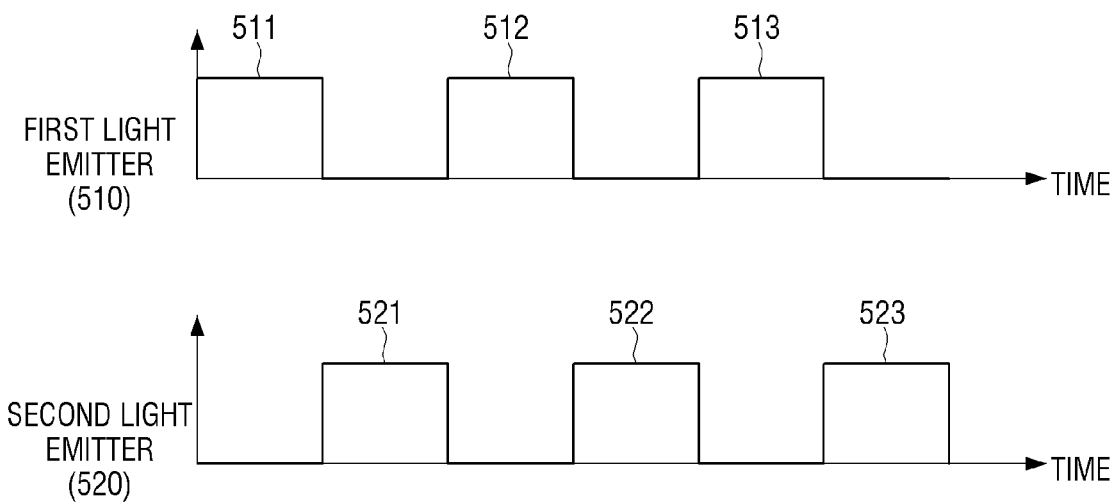
FIG. 5 is a diagram illustrating a graph of a sequential driving method of a sensor included in an electronic apparatus according to an embodiment.

FIG. 5 is a diagram explaining situation in which a plurality of light emitters in the electronic apparatus are sequentially driving according to an embodiment.

Referring to FIG. 5, the first light emitter 510 and the second light emitter 520 may respectively emit a light. For example, the first light emitter 510 and the second light emitter 520 may include a light emitting device having a same light emitting feature, for example, LED. The light emitting feature may include an arriving distance of a light and an illumination angle of a light. Thus, a same light emitting feature may indicate that the first light emitter 510 and the second light emitter 520 may emit a light by same distance and same illumination angle.

When a time of emitting a light by the first light emitter 510 and a time of emitting a light by the second light emitter 520 are overlapped each other, the reliability of the distance calculation result may be lowered because a light emitted from the first light emitter 510 and a light emitted from the second light emitter 520 may be overlapped and received. Therefore, the electronic apparatus 100 may control the first light emitter 510 and the second light emitter 520 to sequentially emit a light at different light emitting timings. Specifically, at times 511, 512, 513 when the first light emitter 510 emits a light, the second light emitter 520 may not emit a light. Further, at times 521, 522, 523 when the second light emitter 520 emits a light, the first light emitter 510 may not emit a light.

Figure 6:
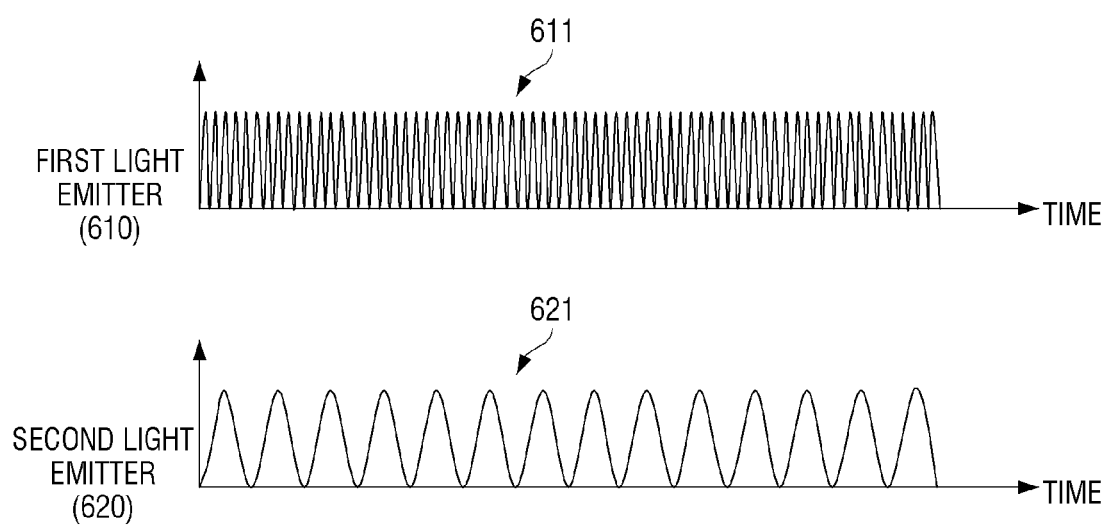
FIG. 6 is a diagram illustrating a graph of a method with which a sensor included in an electronic apparatus is driven while differentiating a frequency according to an embodiment.

FIG. 6 is a diagram explaining situation in which a plurality of light emitters in the electronic apparatus are driven in different frequencies according to an embodiment.

Referring to FIG. 6, the first light emitter 610 and the second light emitter 620 may respectively emit a light. The first light emitter 610 and the second light emitter 620 may include a light emitting device have a same light emitting feature. When a time of emitting a light by the first light emitter 610 and a time of emitting a light by the second light emitter 620 are overlapped each other, the reliability of the distance calculation result may be lowered because a light emitted from the first light emitter 610 and a light emitted from the second light emitter 620 may be overlapped and received. The electronic apparatus 100 may control the first light emitter 610 and the second light emitter 620 to emit a first light having a first frequency 611 and a second light having a second frequency 621, respectively. For example, the first frequency 611 may be a high frequency and the second frequency 621 may be a low frequency.

When the first light emitter 610 and the second light emitter 620 emit a light by having different frequencies, the electronic apparatus 100 may perform the distance calculation having a high reliability without differently setting emitting timing of the first light emitter 610 and the second light emitter 620.

Specifically, the electronic apparatus 100 may include software that can distinguish lights of different frequencies. For example, the software may distinguish a high frequency signal and a low frequency signal. The electronic apparatus 100 may distinguish the first frequency 611 emitted from the first light emitter 610 and reflected against the object and the second frequency 621 emitted from the second light emitter 620 and reflected against the object.

Figure 7:
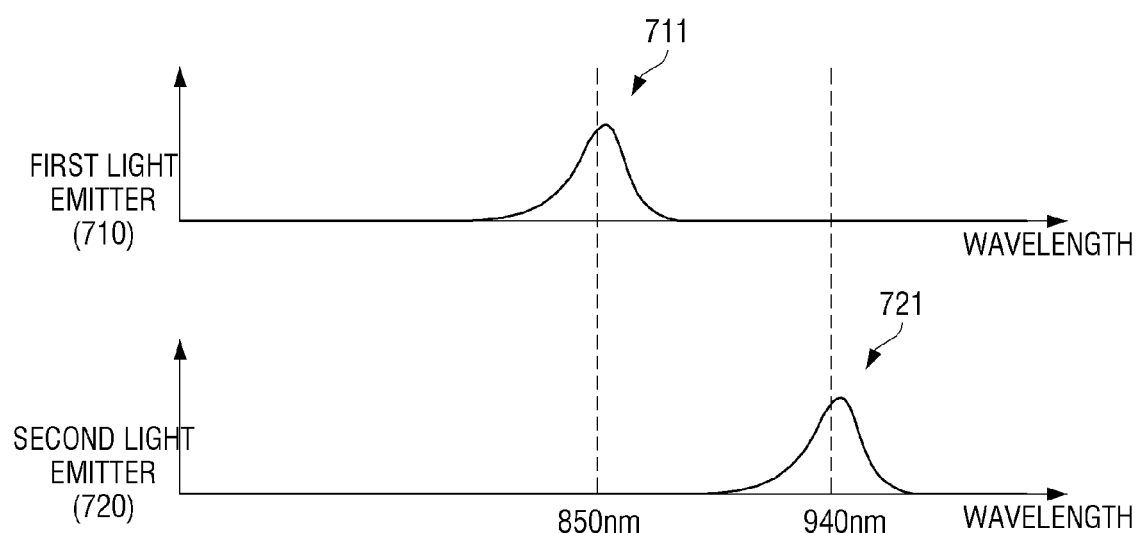
FIG. 7 is a diagram illustrating a graph of a method with which a sensor included in an electronic apparatus is driven while differentiating a frequency according to an embodiment.

FIG. 7 is a diagram explaining situation in which a plurality of light emitters in the electronic apparatus are driven in different frequencies according to an embodiment.

Referring to FIG. 7, the first light emitter 710 and the second light emitter 720 may emit a light respectively. The first light emitter 710 and the second light emitter 720 may include a light emitting device having a same light emitting feature.

When a time of emitting a light by the first light emitter 710 and a time of emitting a light by the second light emitter 720 are overlapped each other, the reliability of the distance calculation result may be lowered because a light emitted from the first light emitter 710 and a light emitted from the second light emitter 720 are overlapped and received. The electronic apparatus 100 may control the first light emitter 710 and the second light emitter 720 to emit a third light having a first wavelength 711 and a fourth light having a second wavelength 721, respectively.

When the first light emitter 710 and the second light emitter 720 emit a light by having different wavelengths, the electronic apparatus 100 may perform the distance calculation having a high reliability without differently setting an emitting time of the first light emitter 710 and the second light emitter 720.

Specifically, the electronic apparatus 100 may control the first light emitter 710 to emit a third light having the first wavelength 711 of 850 nm bandwidth, and the second light emitter 720 to emit a fourth light having the second wavelength 721 of 940 nm bandwidth.

When the above described methods are used, a correct distance may be measured without the mutual light interference even when a distance from the object is measured by using a plurality of light emitters.

When one sensor includes a plurality of light emitters, the electronic apparatus 100 may control an emitting time easily because a plurality of light emitters can be simultaneously controlled. Further, when a plurality of sensors are provided, the electronic apparatus may control each of the sensors, i.e., control each of the sensors to emit a light at different times, which enhancing the reliability of a distance value. However, when a plurality of sensors are separately driving, the light interference should be minimized. For example, when the electronic apparatus 100 is a refrigerator including the sensor and the display, a large mart may set a plurality of refrigerators. In this case, because the sensor included in each refrigerator may be controlled separately, the mutual light interference may occur. Following will describe a method of minimizing the light interference in the above case.

FIG. 8, including (a)-(b), is a diagram explaining situation in which a plurality of sensors in the electronic apparatus sequentially are driven according to an embodiment.

Figure 8A:
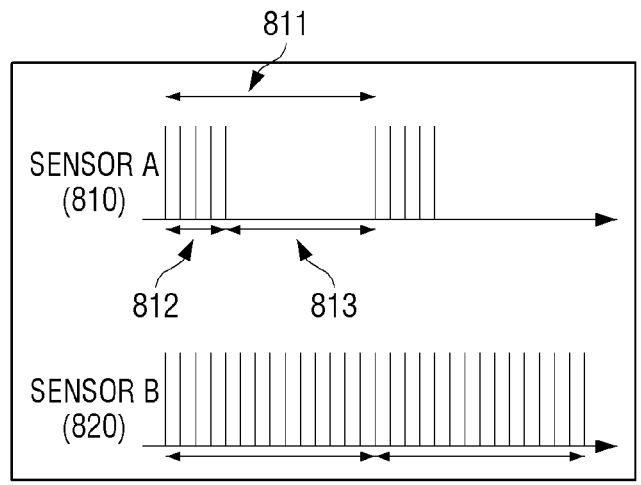
FIG. 8, including (a)-(c), is a diagram illustrating a graph of a method with which sequential driving is performed between sensors operating separately in an electronic apparatus according to an embodiment.

Referring to FIG. 8(a), the sensor A 810 may operate by having a certain period 811. The certain period 811 may include an operation period 812 when the sensor A 810 operates and a pause period 813 when the sensor A 810 does not operate. The sensor B 820 may continue to operate without a period. The sensor A 810 and the sensor B 820 may measure a distance from the object in front of the sensor A 810 and the sensor B 820 to be suitable for each driving environment described above.

The sensor A 810 and the sensor B 820 may be provided on the different electronic apparatuses. However, it may not be limited hereto; the sensor A 810 and the sensor B 820 may be provided together on the one electronic apparatus 100 and may separately operate without mutual connecting such as communication. The sensor A 810 and the sensor B 820 may include a light emitting device having a same light emitting feature. A same light emitting feature may indicate that the sensor A 810 and the sensor B 820 may emit a light by same distance and same illumination angle.

Figure 8B:
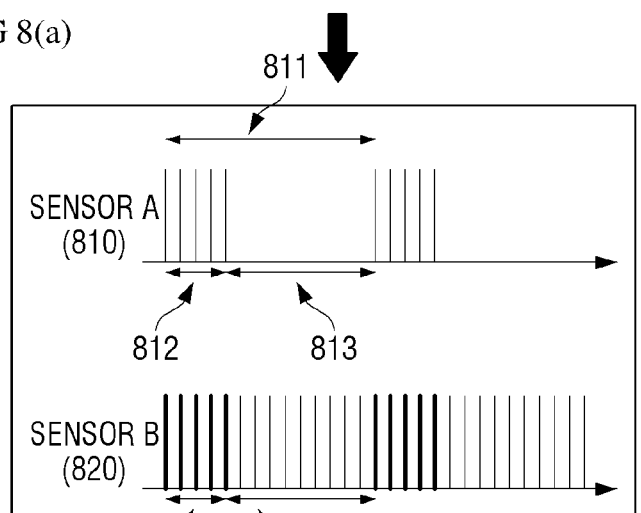

Referring to FIG. 8(b), the sensor A 810 may be driven same as in FIG. 8(a) and measure a distance from the object, and the sensor B 820 may continue to drive without a period and measure a distance from the object. In this case, it is confirmed that the measured distance from the object at a specific period may be different from the measured distance from the object at a different period from the above.

Specifically, the distance from the object at a period 1 821 measured by the sensor B 820 may be different from the distance from the object at a period 2 822 measured by the sensor B 820. The difference may be generated because the period 1 821 may be overlapped with the operation period 812 of the sensor A 810. Therefore, an error in the measured distance from the object may be generated because a light emitted from the sensor A 810 and a light emitted from the sensor B 820 are overlapped each other.

In order to exclude an error from the measured value, the electronic apparatus 100 may consider the environment of using the electronic apparatus 100 and store a standard range regarding a distance measured by the sensors. The electronic apparatus 100 may compare a standard range of the measured distance by the sensors with a prestored distance, and determine whether the measured distance by the sensors has an error. For example, when a standard range of a preset distance is 1-2 m, the measured distance at the period 1 821 is 4 m or 20 cm, and the measured distance at the period 2 822 is 1.5 m, the sensor B 820 may determine that the measured distance at the period 1 821 has an error, and use the measured distance at the period 2 822 only while excluding the measured distance at the period 1 821.

According to another embodiment, although the sensor A 810 and the sensor B 820 do not communicate each other, the sensor B 820 may be previously inputted with operation in which the period 1 812 which is an operation period of the sensor A 810 is driving shorter than the period 2 813 which is a pause period. In this case, because the period 1 821 is shorter than the period 2 822, the sensor B 820 may determine that the period 1 821 is a section where the interference with the sensor A 810 occurs, stop the driving, and drive again so as to measure a distance at the period 2 822.

Figure 8C:
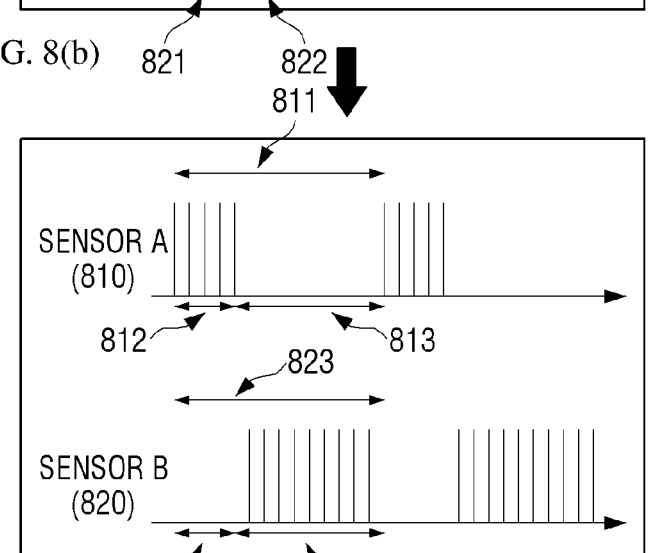

Referring to FIG. 8(c), the sensor A 810 may measure a distance from the object by driving same as in FIG. 8(a), and the sensor B 820 may be driven by having a certain period 823 differently from FIG. 8(a) and measure a distance from the object. Herein, the certain period 823 corresponding to the sensor B may include the operation period 822 when the sensor B 820 operates and the pause period 821 when the sensor B 820 does not operate. In this case, the period 811 of the sensor A 810 and the period 823 of the sensor B 820 are same as each other, but the operation period and the pause period may be contrary to each other. Thus, the sensor A 810 and the sensor B 820 may be modified in terms of a driving method in which driving is alternately and sequentially performed.

Thereby, the sensor A 810 and the sensor B 820 may be driven according to each driving method without exchanging information, and after some time, may be sequentially driven to correctly measure a distance from the object. Thus, the sensor B 820 may estimate driving state of the sensor A 810, and may automatically change the driving period 823 such that the light interference cannot be generated between a light emitted from the sensor B 820 and a light emitted from the sensor A 810.

The electronic apparatus 100 may have the sensor disposed such that a plurality of light emitters can irradiate a light in a same direction. However, depending on embodiments, the electronic apparatus may have the sensor disposed such that a plurality of light emitters can irradiate a light in different directions without irradiating in a same direction. Following will describe a case in which a plurality of light emitters irradiate a light in different directions.

Figures 9A, 9B:
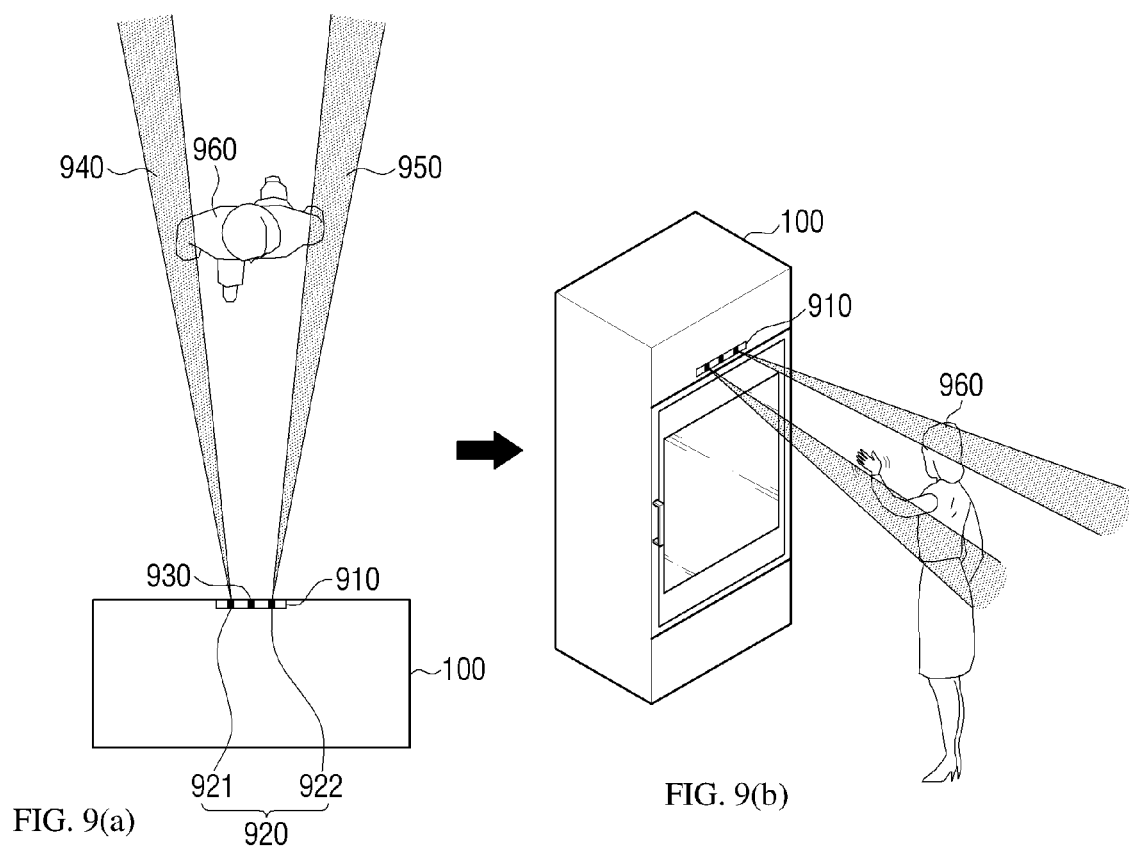
FIG. 9, including (a) and (b), is a diagram illustrating arrangement of a sensor included in an electronic apparatus according to another embodiment.

FIG. 9, including (a) and (b), is a diagram explaining situation in which a plurality of light emitters in the electronic apparatus irradiate a light in different directions according to various embodiments.

FIG. 9(*a*) is a diagram in which the electronic apparatus 100 including the sensor 910 is viewed from the above. FIG. 9(*b*) is a side diagram in which the electronic apparatus 100 including the sensor 910 is viewed from the side. Although FIG. 9(*b*) illustrates that one sensor 910 is disposed on a specific position, at least one sensor 910 may be disposed on various positions of the electronic apparatus 100. Various arrangements of the sensor 910 are already described in FIG. 4, which will not be further explained below.

Referring to FIG. 9, the sensor 910 may be disposed on one side of the electronic apparatus 100 and emit a light externally of the electronic apparatus 100. As described in FIG. 3, the sensor 910 may include the light emitter 920 and the light receiver 930. According to an embodiment, the sensor 910 may include a plurality of light emitters 921, 922.

A plurality of light emitters 921, 922 may emit a light in different directions. For example, the first light emitter 921 may emit a first light 940 and the second light emitter 922 may emit a second light 950. When the electronic apparatus 100 is viewed from the above, the first light 940 may be emitted to be inclined to a left side from the front of the electronic apparatus 100 by certain angle, and the second light 950 may be emitted to be inclined to a right side from the front of the electronic apparatus 100 by certain angle.

As illustrated in FIG. 9, in the structure of emitting the first light 940 and the second light 950 toward the left and the right sides from the center of the electronic apparatus 100, a plurality of light emitters 921, 922 may share one light receiver 930. In this case, the light receiver 930 may be disposed between a plurality of light emitters 921, 922.

As described above, when a plurality of light emitters 921, 922 share one light receiver 930, a size of the sensor may be reduced, and thus, the arrangement space for the sensor within the electronic apparatus 100 may be reduced. However, it may not be limited hereto; a plurality of light emitters 921, 922 may be implemented to include corresponding light receivers.

Meanwhile, when a plurality of light emitters 921, 922 emit a light in different directions, the sensor 910 may recognize a position and the movement of the object 960 more correctly. Specifically, as an illumination range covered by the light emitter 920 increases, a dead zone where a light does not arrive may be reduced. Further, because data collecting may be separately performed in each of the light emitters 921, 922, the movement of the object 960 can be divided and distinguished more finely.

In this case, a plurality of light emitters included in the sensor may have a same light emitting feature, but may have different light emitting features. Thus, a distance that a light arrives and an angle that a light is irradiated may be differently set. Following will describe various arrangements regarding a plurality of light emitters having different light emitting features.

Figures 10A, 10B:
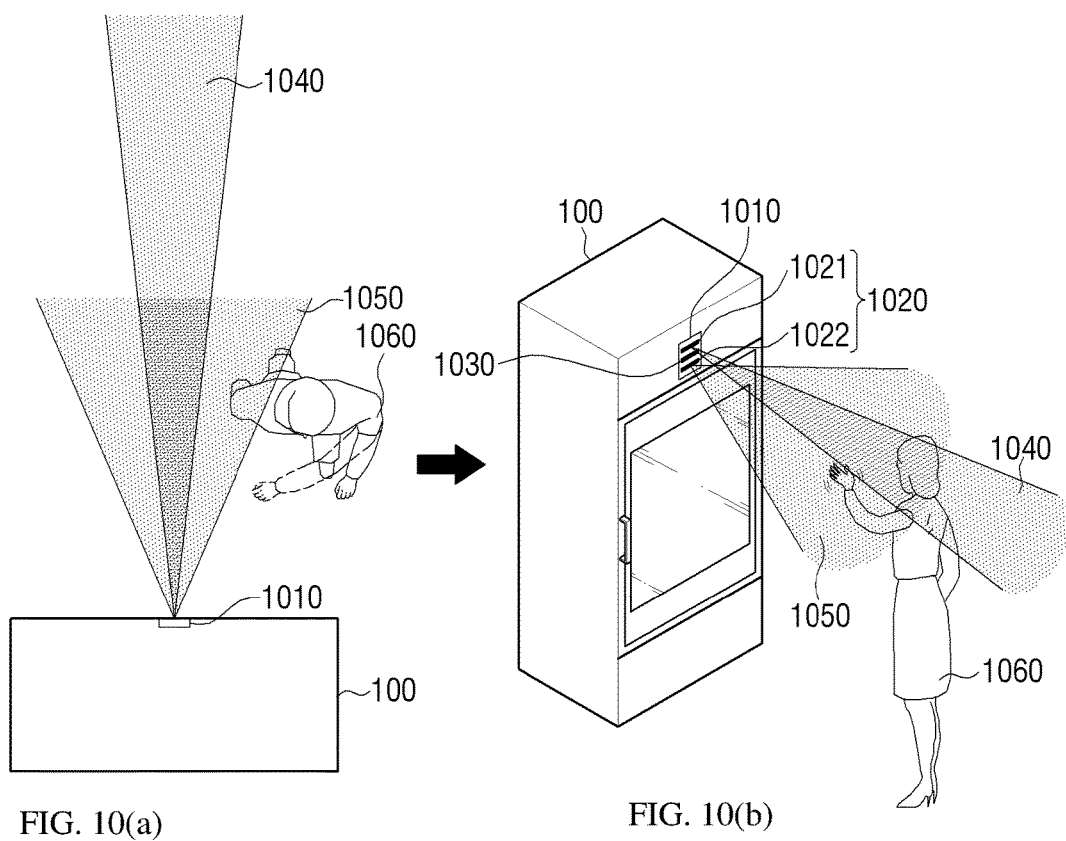
FIG. 10, including (a) and (b), is a diagram illustrating arrangement and a driving method of a sensor included in an electronic apparatus according to an embodiment.

FIG. 10, including (a) and (b), is a diagram explaining situation in which a plurality of light emitters in the electronic apparatus emit a light in different illumination angles according to various embodiments.

FIG. 10(*a*) is a diagram in which the electronic apparatus 100 including the sensor 1010 is viewed from the above. FIG. 10(*b*) is a side diagram in which the electronic apparatus 100 including the sensor 1010 is viewed from the side. Although FIG. 10(*b*) illustrates that one sensor 1010 is disposed on a specific position, at least one sensor 1010 may be disposed on various positions of the electronic apparatus 100. Various arrangements of the sensor 1010 are already described in FIG. 4, which will not be specifically described below.

Referring to FIG. 10, the sensor 1010 may be disposed on one face of the electronic apparatus 100, and may emit a light externally of the electronic apparatus 100. As described in FIG. 3, the sensor 1010 may include the light emitter 1020 and the light receiver 1030. According to an embodiment, the sensor 1010 may include a plurality of light emitters 1021, 1022.

A plurality of light emitters 1021, 1022 may emit a light by having different illumination angles. For example, the first light emitter 1021 may emit a first light 1040, and the second light emitter 1022 may emit a second light 1050. When the electronic apparatus 100 is viewed from the above, the first light 1040 may be emitted in front of the electronic apparatus 100 by having an illumination angle of +−10° or +−20°. When the electronic apparatus is viewed from the above, the second light 1050 may be emitted in front of the electronic apparatus 100 by having an illumination angle of +−45°. However, an illumination angle may not be limited hereto, and various angles may be included.

As illustrated in FIG. 10, in the structure of emitting the first light 1040 and the second light 1050 at the center of the electronic apparatus 100, a plurality of light emitters 1021, 1022 may share one light receiver 1030. The light receiver 1030 may be disposed between a plurality of light emitters 1021, 1022.

As described, when a plurality of light emitters 1021, 1022 share one light receiver 1030, a size of the sensor may be reduced, and thus, a space for disposing the sensor within the electronic apparatus 100 may be reduced. However, it may not be limited hereto; a plurality of light emitters 1021, 1022 may be implemented to include the corresponding light receivers, respectively.

When a plurality of light emitters 1021, 1022 emit a light by different illumination angles, the sensor 1010 may recognize a position and the movement of the object 1060 more correctly. Specifically, as an illumination range covered by the light emitter 1020 increases, a dead zone where a light does not arrive may be reduced. Further, because data collecting may be performed per each of the light emitters 1021, 1022, the movement of the object 1060 can be divided and distinguished more finely.

Figures 11A, 11B:
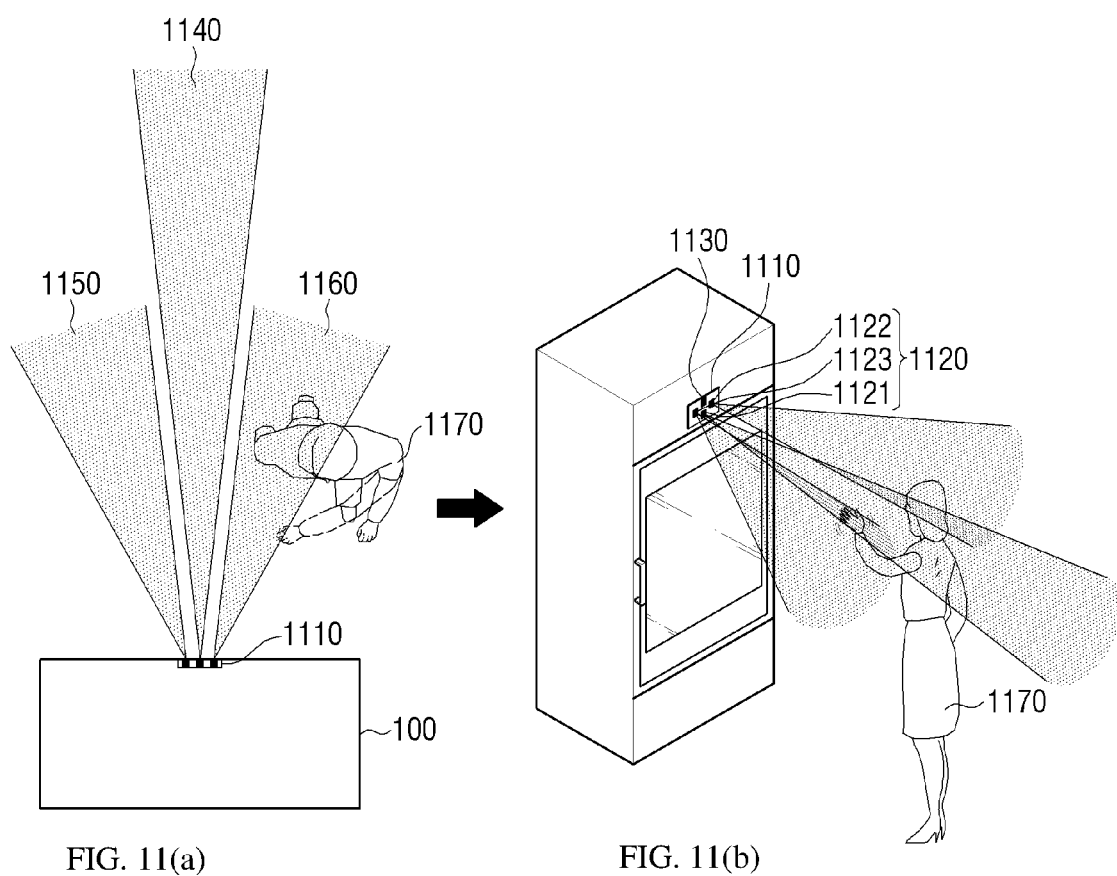
FIG. 11, including (a) and (b), is a diagram illustrating arrangement and a driving method of a sensor included in an electronic apparatus according to another embodiment.

FIG. 11, including (a) and (b), is a diagram explaining situation in which a plurality of light emitters in the electronic apparatus emit a light by different directions and illumination angles according to various embodiments.

FIG. 11(*a*) is a diagram in which the electronic apparatus 100 including the sensor 1110 is viewed from the above. FIG. 11(*b*) is a side diagram in which the electronic apparatus 100 including the sensor 1110 is viewed from the side. Although FIG. 11(*b*) illustrates that one sensor 1110 is disposed on a specific position, at least one sensor 1110 may be disposed on various positions of the electronic apparatus 100. Various arrangements of the sensor 1110 are already explained in FIG. 4, which will not be specifically described below.

Referring to FIG. 11, the sensor 1110 may be disposed on one side of the electronic apparatus 100 and may emit a light externally of the electronic apparatus 100. As described in FIG. 3, the sensor 1110 may include the light emitter 1120 and the light receiver 1130. According to an embodiment, the sensor 1110 may include a plurality of light emitters 1121, 1122, 1123.

A plurality of light emitters 1121, 1122, 1123 may emit a light by having different directions and illumination angles. For example, the first light emitter 1121 may emit a first light 1140, the second light emitter 1122 may emit a second light 1150, and the third light emitter 1123 may emit a third light 1160. When the electronic apparatus 100 is viewed from the above, the first light 1140 may be emitted in front of the electronic apparatus 100 by having an illumination angle of +−10°. When the electronic apparatus 100 is viewed from the above, the second light 1150 may be emitted to the left sided face of the electronic apparatus 100 by having an illumination angle of +−30°, and the third light 1160 may be emitted to the right sided face of the electronic apparatus 100 by having an illumination angle of +−30°.

As illustrated in FIG. 11, in the structure of emitting the first light 1140, the second light 1150, and the third light 1160 at the center of the electronic apparatus 100, a plurality of light emitters 1121, 1122, 1123 may share one light receiver 1130. The light receiver 1130 may be disposed between a plurality of light emitters 1121, 1122, 1123. Thereby, when a plurality of light emitters 1121, 1122, 1123 share one light receiver 1130, a size of the sensor may be reduced, and thus, a space for disposing the sensor within the electronic apparatus 100 may be reduced. However, it may not be limited hereto; a plurality of light emitters 1121, 1122, 1123 may be implemented to include corresponding light receivers, respectively.

When a plurality of light emitters 1121, 1122, 1123 emit a light by different directions and illumination angles, the sensor 1110 may recognize a position and the movement of the object 1160 more correctly. Specifically, as an illumination range covered by the light emitter 1120 increases, a dead zone where a light does not arrive may be reduced. Further, because data collecting may be performed in each of the light emitters 1121, 1122, 1123, the movement of the object 1160 can be divided and distinguished more finely.

As described above, the electronic apparatus 100 may sense approaching of the object with various arrangements of the sensor. By using the various arrangements, the electronic apparatus 100 may control the transparent display or the mirror display in various forms. Following will describe various embodiments in which the electronic apparatus 100 senses a distance from the object and controls the transparent display or the mirror display.

FIG. 12, including (a)-(c), is a diagram explaining situation in which a transparency is adjusted according to approaching of a user when the electronic apparatus is a refrigerator including the transparent display according to an embodiment.

Figure 12A:
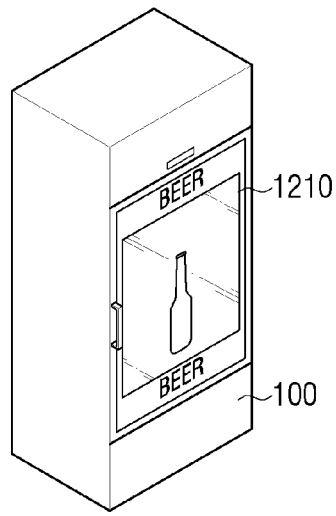
FIG. 12, including (a)-(c), is a diagram illustrating a method for controlling a transparent display when an electronic apparatus includes a transparent display according to an embodiment.

Referring to FIG. 12(a), the electronic apparatus 100 may be implemented to be a refrigerator, and may include the transparent display 1210 on a door that can be opened and closed. Further, the electronic apparatus 100 may include the above described sensor that can detect whether a user approaches or not.

When the sensor does not detect a user 1220 as described in FIG. 12(a), the transparent display 1210 may display specific contents, e.g., advertisement contents regarding items stored within the electronic apparatus 100. Thus, when the electronic apparatus 100 displays specific contents, the visibility of the contents may become greater by lowering a transparency of the transparent display 1210.

A transparency of the transparent display 1210 may be adjusted based on a distance from a user. For example, when a user 1220 approaches within a first preset distance 1230, a transparency may be modified to be 70%. When a user 1220 approaches within a second preset distance 1240, a transparency may be modified to be 100%. Thus, when a distance between a user 1220 and the electronic apparatus 100 becomes nearer, a transparency may become higher. When a distance between a user 1220 and the electronic apparatus 100 becomes farther, a transparency may become lower.

Figure 12B:
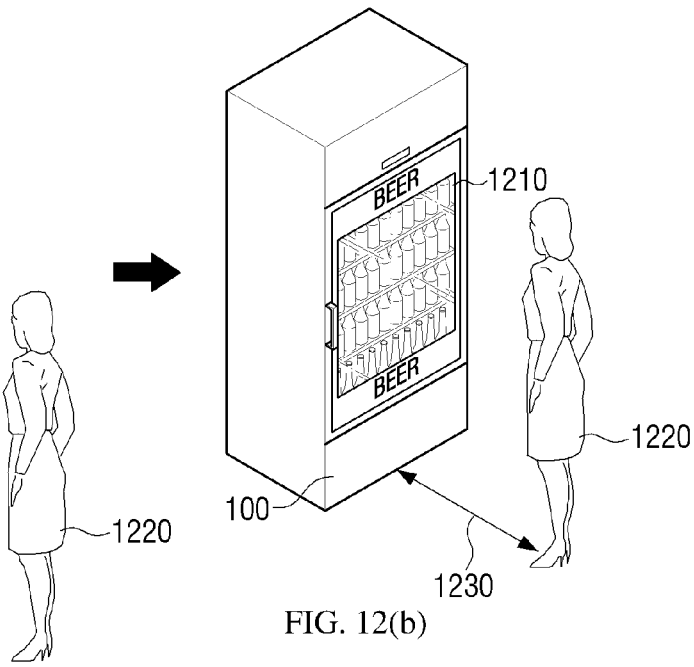

Referring to FIG. 12(b), a user 1220 may be detected on the first preset distance 1230, and the electronic apparatus 100 may control the transparent display 1210. Specifically, the electronic apparatus 100 may control the display 1210 to increase a transparency of the transparent display 1210 to be 70% such that items stored within the electronic apparatus 100 and the reproducing contents can be simultaneously viewed. In this case, a user 1220 may confirm items stored within the electronic apparatus 100 while viewing the contents.

Figure 12C:
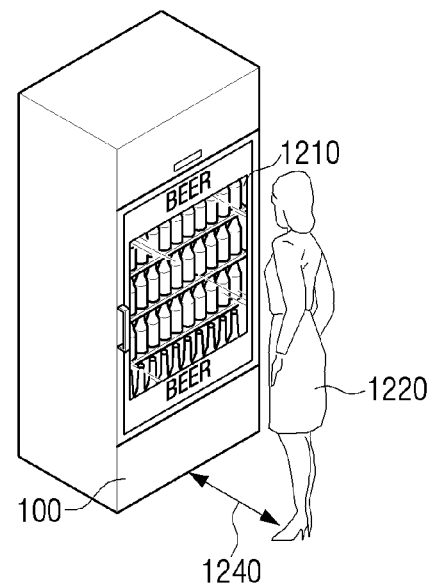

FIG. 12(c) illustrates that a user 1220 and the electronic apparatus 100 approach nearer to the second preset distance 1240. The electronic apparatus 100 may increase a transparency of the transparent display 1210 to be 100% based on a distance from a user 1220. Thus, a user 1220 may distinguish items stored within the electronic apparatus 100 conveniently.

FIG. 13, including (a)-(b), is a diagram explaining situation in which the transparent display is used when the electronic apparatus is a refrigerator including the transparent display according to an embodiment.

Figure 13A:
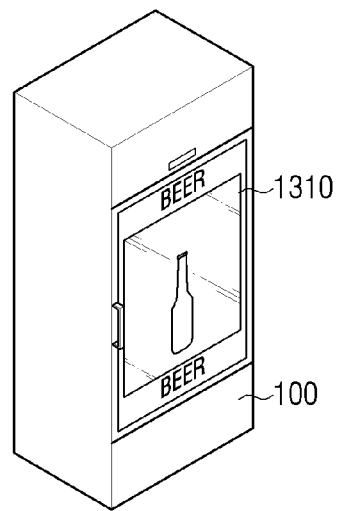
FIG. 13, including (a)-(c), is a diagram illustrating a method for controlling a transparent display when an electronic apparatus includes the transparent display according to another embodiment.
Figure 13B:
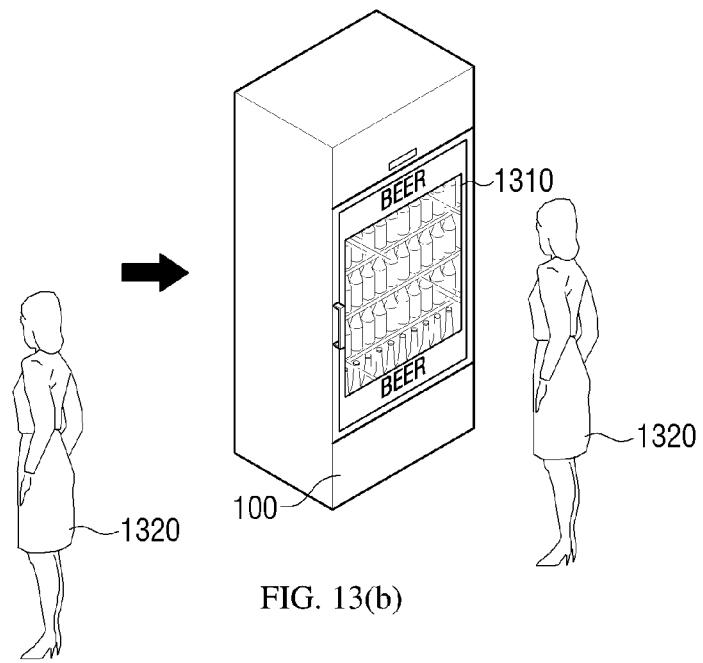

Referring to FIG. 13, the electronic apparatus 100 may be implemented to be a refrigerator, and include the transparent display 1210 on a door that can be opened and closed. Further, the electronic apparatus 100 may include the above described sensor that can detect whether a user 1220 approaches or not. As illustrated in FIGS. 13(a) and 13(b), the electronic apparatus 100 may display contents on the transparent display 1310, and adjust a transparency of the transparent display 1310 by sensing approaching of a user 1320, which will not be further described below because it is already described above in FIG. 12.

Figure 13C:
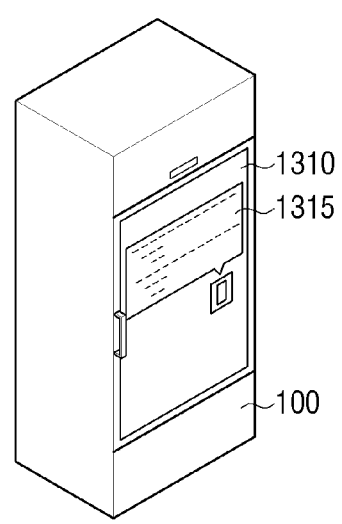

In FIG. 13(b), a user 1220 may select one region of the transparent display 1310 in which a specific item is viewed. A method of selecting one region of the transparent display 1310 may be, for example, a touch input. The electronic apparatus 100 may sense a touch input of a user, and display contents 1315 related with an item corresponding to the touched position among the items positioned on the back side of the display 1310 on the transparent display 1310, as illustrated in FIG. 13(c).

Herein, the contents 1315 may be additional explanation regarding advertisement contents or stored items, for example. In this case, the electronic apparatus 100 may control a transparency of the transparent display 1310 to be lowered such that the visibility of the displayed contents 1315 can be enhanced.

FIG. 14, including (a)-(b), is a diagram explaining situation in which the mirror display is used when the electronic apparatus is the mirror display according to an embodiment.

Figures 14A, 14B, 14C:
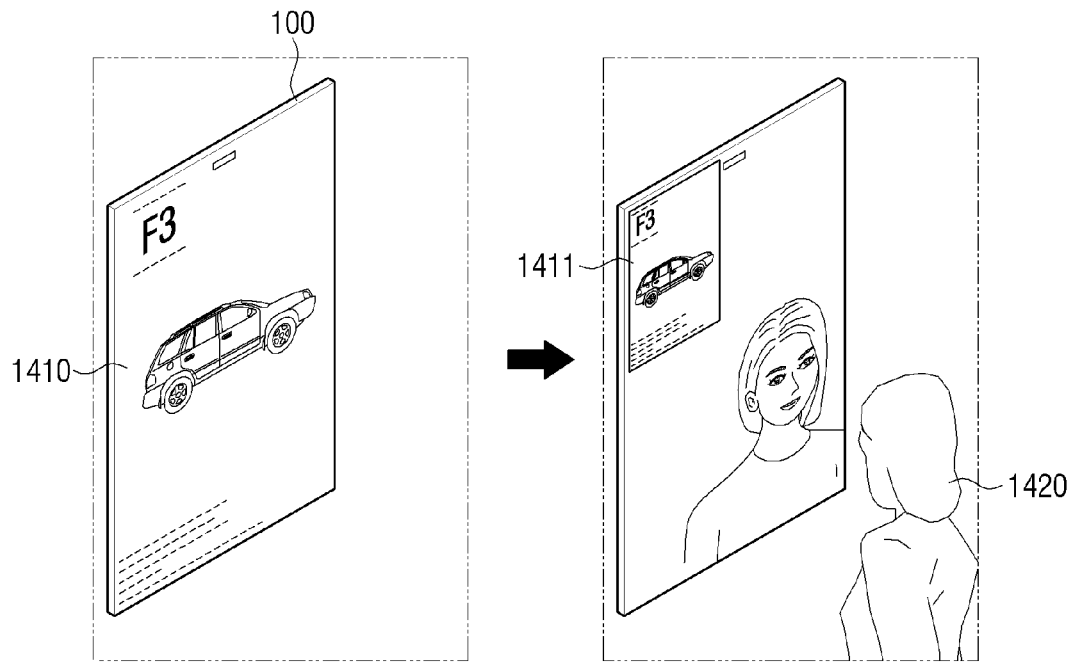
FIG. 14, including (a)-(c), is a diagram illustrating a method for controlling a mirror display when an electronic apparatus includes a mirror display according to an embodiment.

Referring to FIG. 14(a), the electronic apparatus 100 may be implemented to be a mirror device including the mirror display 1410. Further, the electronic apparatus 100 may include the sensor that can detect whether a user 1420 approaches or not, as described above.

As illustrated in FIG. 14(*a*), when a user 1420 is not detected by the sensor, the electronic apparatus 100 may display contents on the mirror display 1410. When the electronic apparatus 100 displays contents on the mirror display 1410, the mirror display 1410 may not perform the mirror function of reflecting and showing a user posture. However, when the electronic apparatus 100 displays contents on one region of the mirror display 1410, the mirror function may be provided on another region where the contents is not displayed such that a user can confirm his reflecting posture.

A size of the contents displayed on the mirror display 1410 may be adjusted based on a distance from a user 1420. For example, as a distance between a user 1420 and the electronic apparatus 100 becomes nearer, a size of the contents may become smaller. On the contrary, as a distance between a user 1420 and the electronic apparatus 100 becomes farther, a size of the contents may become greater.

Referring to FIG. 14(*b*), as a distance between the electronic apparatus 100 and a user 1420 becomes nearer, the electronic apparatus 100 may show a display state by reducing a size of the contents 1411 displayed on the mirror display 1410. In this case, the electronic apparatus 100 may change a position of the contents 1411 based on a distance of a user 1420.

Referring to FIG. 14(*c*), the electronic apparatus 100 may change a display position of the contents 1411 by sensing and responding to the change in a position of a user 1420. Thus, a user 1420 may confirm the contents 1411 displayed on the mirror display 1410 conveniently while changing a position freely at the mirror.

Figures 15A, 15B:
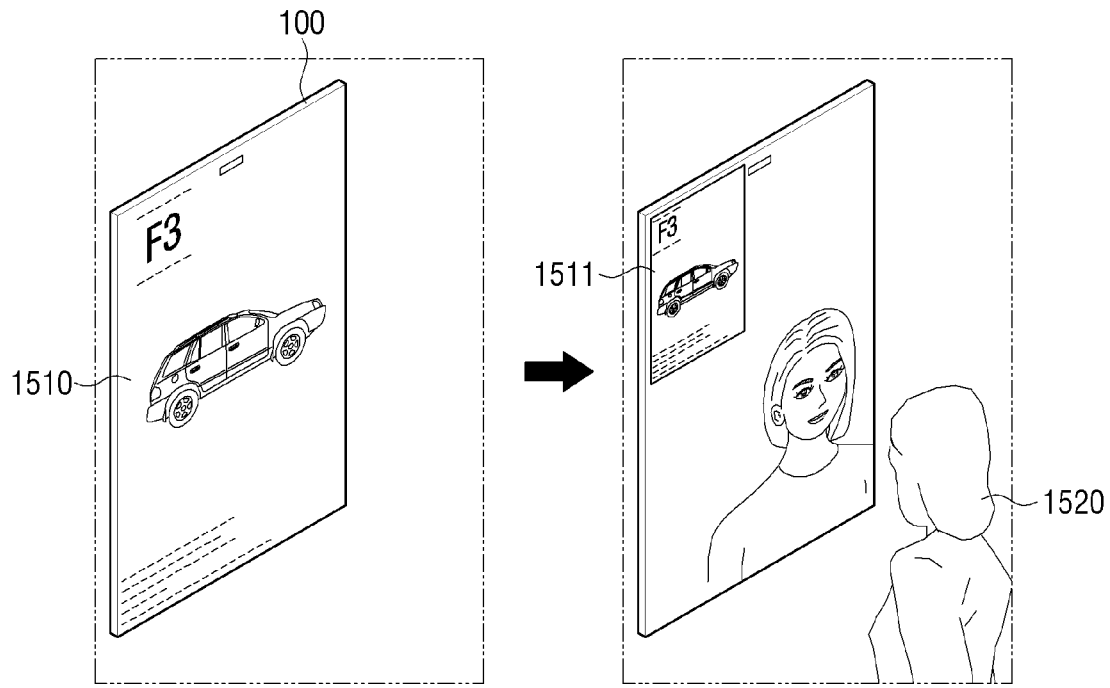
FIG. 15, including (a)-(b), is a diagram illustrating a method for controlling a mirror display when an electronic apparatus includes a mirror display according to an embodiment.
Figure 15C:
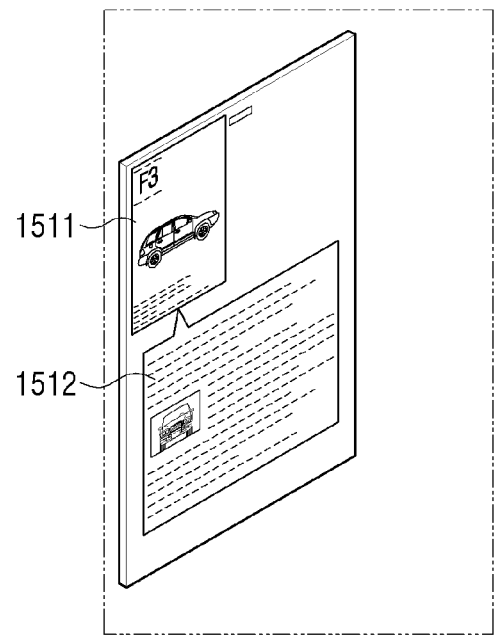

FIG. 15, including (a)-(b), is a diagram explaining situation in which the mirror display is used when the electronic apparatus is the mirror display according to an embodiment.

Referring to FIG. 15, the electronic apparatus 100 may be implemented to be a mirror device including the mirror display 1410. Further, the electronic apparatus 100 may include the sensor that can detect whether a user 1520 approaches or not, as described above. As illustrated in FIGS. 15(*a*) and 15(*b*), the electronic apparatus 100 may display contents on the mirror display 1510, and change a size of the displayed contents 1511 on the mirror display 1510 by sensing the approaching of a user 1520, which may not be further explained below because it is already described above in FIG. 14.

Referring to FIG. 15(*b*), a user 1420 may select one region of the mirror display 1510 where the contents 1511 is displayed. A method of selecting one region of the mirror display 1510 may be, for example, a touch input. The electronic apparatus 100 may sense a touch input of a user, and display contents related with the selected contents 1511 on the mirror display 1510, as illustrated in FIG. 15(*c*).

Referring to FIG. 15(*c*), the electronic apparatus 100 may display the contents 1512 related with the selected contents 1511 on the mirror display 1510. Herein, the related contents 1512 may be additional explanation or advertisement contents regarding the displayed contents 1511, for example.

Figure 16:
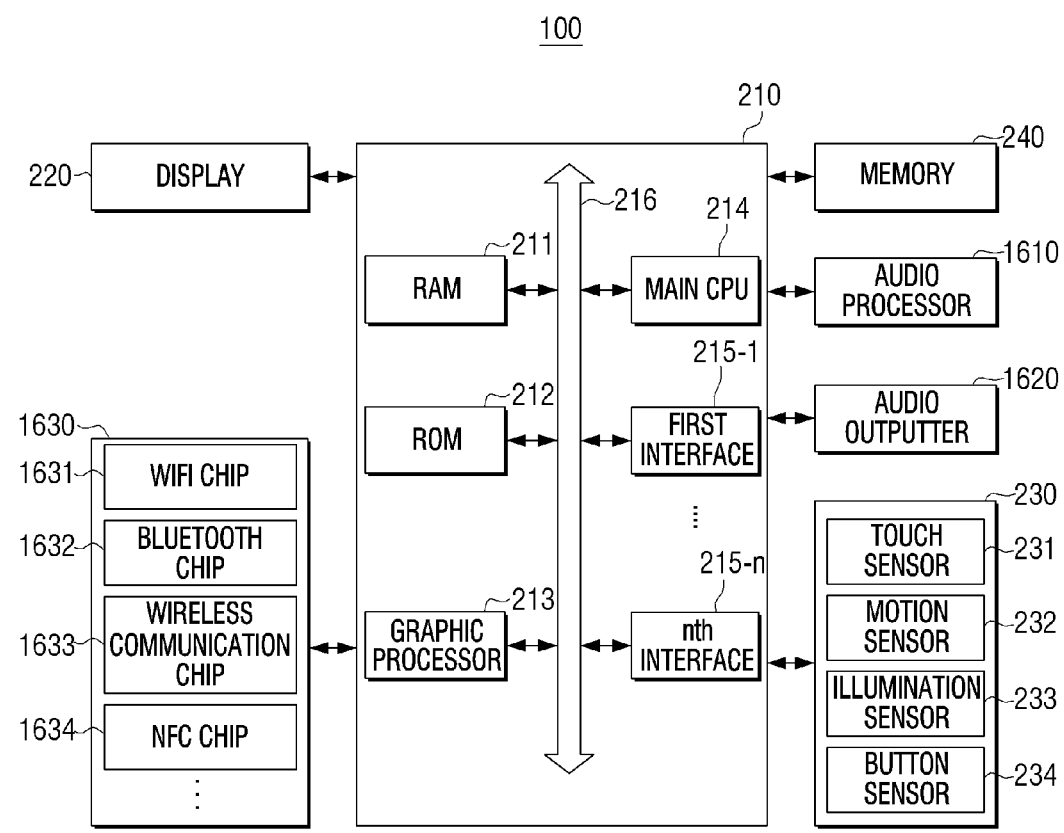
FIG. 16 is a block diagram illustrating brief constitution of an electronic apparatus according to an embodiment.

FIG. 16 is a block diagram illustrating a constitution of the electronic apparatus according to an embodiment.

As illustrated in FIG. 16, the electronic apparatus 100 may include at least one of the display 220, the communicator 1630, the memory 240, an audio processor 1610, an audio outputter 1620, the sensor 230, and the processor 210. Meanwhile, the constitution of the electronic apparatus 100 illustrated in FIG. 16 is merely one of embodiments, and may not be limited to the above block diagram. Therefore, some units in the constitution of the electronic apparatus illustrated in FIG. 16 may be removed, modified or added according to the type or the purpose of the electronic apparatus 100.

The display 220 may display various screens on the display region. On the various screens, various types of contents (e.g., images, video, or texts), and UI elements that can control the contents or the electronic apparatus 100 may be displayed.

The display 220 may have various sizes. For example, the display 220 may have various sizes such as 4.65 inches, 5 inches, 6.5 inches, 8.4 inches, 20 inches, 40 inches, and 60 inches.

The display 220 may be implemented to be various types of the display panel. For example, the display panel may be implemented with various display technologies such as liquid crystal display (LCD), organic light emitting diodes (OLED), active-matrix organic light emitting diode (AM-OLED), liquid crystal on silicon (LcoS), or digital light processing (DLP).

The display 220 may be combined with at least one of a front region, side region, and a back region of the electronic apparatus 100 in a flexible display form.

The display 220 may be implemented to be a layer structure of a touch screen by being combined with a touch sensor 221. The touch screen may have a function of detecting a touch input pressure also with touch input position and touched dimensional size in addition to the display function. Further, the touch screen may include a function of detecting a proximity touch also with a real touch.

The communicator 1630 is unit to perform the communication with various types of external devices according to various types of communication methods. The communicator 1630 may include at least one of WFi chip 1631, Bluetooth chip 1632, wireless communication chip 1633, and NFC chip 1634. The processor 210 may perform the communication with an external server or various external devices by using the communicator 1630. Some of the contents displayed on the display 220 by the electronic apparatus 100 may be data received from an external server or various external devices by using the communicator.

The audio processor 1610 is unit to process audio data of video contents. The audio processor 1610 may perform various processes such as decoding, amplifying and noise filtering regarding the audio data. The audio data processed in the audio processor 1610 may be outputted to the audio outputter 1620.

The audio outputter 1620 is unit to output various alarm sounds or voice messages as well as various audio data in which various processes such as decoding, amplifying and noise filtering are performed. Specifically, the audio outputter 1620 may be implemented to be a speaker; however, this is merely one of embodiments, and it may be implemented to be outputting component that can output the audio data.

The sensor 230 may sense various user inputting. Further, the sensor 230 may detect at least one of various changes such as posture change, illumination change, and acceleration change of the electronic apparatus 100, and deliver a corresponding electrical signal to the processor 210. Thus, the sensor 230 may sense the state change occurring based on the electronic apparatus 100, generate a sensing signal, and deliver to the processor 210.

According to an embodiment, the sensor 230 may include various sensors. The state change of the electronic apparatus 100 may be sensed by providing the electrical power to at least one set sensor according to the controlling of the sensor 230 when the electronic apparatus 100 is driving (or based on a user setting). In this case, the sensor 230 may include various sensors, and constituted to include at least one device among every type of the sensing device that can detect the state change of the electronic apparatus 100. For example, the sensor 230 may be constituted to include at least one sensor among various sensing devices such as touch sensor, acceleration sensor, gyro sensor, illumination sensor, proximity sensor, pressure sensor, noise sensor (e.g., microphone), video sensor (e.g., camera module), pen recognizing sensor and timer.

The sensor 230 may be divided into the touch sensor 231, a motion sensor 232, an illumination sensor 233 and a button sensor 234 according to a sensing purpose, although not limited thereto, and the sensor 230 may be divided according to other various purposes.

Further, dividing may not be limited to the physical one; at least one sensor may be combined and perform roles of the sensors 231, 232, 233, 234. Further, constitution or function of the sensor 230 may be partly included in the processor 210 according to an implementing method.

The touch sensor 231 may sense a user finger inputting, and output a touch event value corresponding to the sensed touch signal. The touch panel of the touch sensor 231 may be equipped under the display 220. Specifically, the touch sensor 231 may sense a touch or a touch drag mentioned in the above various embodiments. The touch sensor 231 may deliver a coordinate value regarding the touch point to the processor 210 when a touch drag is sensed. The processor 210 may determine a feature of the touch drag based on the coordinate value, and perform operation such as contents displaying or contents position moving.

The touch sensor 231 may obtain an output signal according to a user inputting from the touch sensor. The touch sensor 231 may calculate a user inputting information such as touch position or touch coordinate, touch number, touch intensity, cell ID, touch angle or touch dimensional size from the signal values, and determine a type of the touch input by using the calculated user inputting information. Herein, the touch sensor 231 may determine a type of the touch input by using touch recognizing algorithms and touch pattern data in the memory (not illustrated) of the touch panel. When a type of the touch input is determined, the touch sensor 231 may transmit information regarding the type of the touch input to the processor 210. The touch sensor 231 may sense a position (or hovering position) of a proximity touch inputted by a user, as described above.

Herein, the processor 210 may substitute a portion of functions of the touch sensor 231. For example, the touch sensor 231 may transmit a signal value obtained from the touch sensor or the user inputting information calculated from the signal value to the processor 210. The processor 210 may determine a type of the touch input from the received signal value or the user inputting information by using the touch recognizing algorithms and the touch pattern data stored in the memory 240. Further, for example, when a phone application is implemented, the processor 210 may detect the selecting of a call button on the phone application from the user inputting information or the type of the touch input, and transmit a call request to a third party through the communicator 1630.

The motion sensor 232 may sense the movement of the electronic apparatus 100 (e.g., rotation movement, tilting movement) by using at least one of the acceleration sensor, the tilt sensor, the gyro sensor, and the 3-axis magnetic sensor. Further, the motion sensor 232 may deliver the generated electrical signal to the processor 210. For example, the motion sensor 232 may measure an acceleration adding a movement acceleration and a gravity acceleration of the electronic apparatus 100; however, when there is no movement in the electronic apparatus 100, only a gravity acceleration may be measured.

The illumination sensor 233 may sense a brightness of the surrounded area to the electronic apparatus 100 by using the illumination sensor. The illumination sensor may sense a brightness by using an optical battery, but also by using a phototube. As an example of the illumination sensor, CDS illumination sensor may sense a brightness of the surrounded area to the electronic apparatus 100 by being installed on both sides of the electronic apparatus 100. The illumination sensor 233 may convert a voltage obtained through the illumination sensor into a digital value and transmit to the processor 210.

The sensor 230 may further include a pen sensor (e.g., pen recognizing panel, not illustrated). The pen sensor may sense a user pen inputting according to the using of a user touch pen (e.g., stylus pen) or a user digitizer pen, and output a pen approaching event value or a pen touch event value. The pen sensor may be, for example, implemented with EMR method, and may sense a touch input or an approach inputting according to the intensity change of the electromagnetic field with a pen approaching or a pen touch.

The sensor 230 may further include a sensor in IR ToF method described in FIG. 3. The sensor in IR ToF method is already specifically explained in FIG. 3, which will not be further described below.

The microphone (not illustrated) may receive a user voice to control a medical device through the electronic apparatus 100 (e.g., photo start, photo stop or photo complete), and recognize the user voice through voice recognizing module. Further, the recognizing result may be transmitted to the processor 210. At the above operation, the voice recognizing module may be positioned on a portion of the processor 210 or on an external region of the electronic apparatus 100 instead of the microphone.

The processor 210 may control general operation of the electronic apparatus 100 by using various programs stored in the memory 240.

The processor 210 may include RAM 211, ROM 212, a graphic processor 213, a main CPU 214, a first to an nth interface 215-1 to 215-$n$, and a bus 216. Herein, RAM 211, ROM 212, the graphic processor 213, the main CPU 214, and the first to the nth interface 215-1 to 215-$n$ may be connected each other through the bus 216.

RAM 211 may store O/S and application programs. Specifically, when the electronic apparatus 100 boots, O/S may be stored in RAM 211, and the various application data selected by a user may be stored in RAM 211.

ROM 212 may store command sets for the system booting. When a turn-on command is inputted and the electrical power is provided, the main CPU 214 may copy the stored O/S in the memory 240 to RAM 211 according to the stored command, and boot the system by implementing O/S. When the booting completes, the main CPU 214 may copy the various application programs stored in the memory 240 to RAM 211, and perform various operation by implementing the copied application programs in RAM 211.

The graphic processor 213 may generate a screen including various objects such as items, images, and texts by using a calculator (not illustrated) and a renderer (not illustrated). Herein, the calculator may be unit to calculate a feature value such as coordinate value, shape, size and color in which each object will be displayed according to a layout of the screen by using the control command received from the sensor 230. Further, the renderer may be unit to generate various layouts of a screen including objects based on the feature value calculated in the calculator. The screen generated in the renderer may be displayed within a display region of the display 220.

The main CPU 214 may access to the memory 240 and perform the booting by using the stored O/S in the memory 240. Further, the main CPU 214 may perform various operation by using the stored various programs, contents, and data in the memory 240.

The first to the nth interface 215-1 to 215-*n* may be connected with the above described units. One of the first to the nth interface 215-1 to 215-*n* may be a network interface connected with an external device through network.

The memory 240 may store various programs and data necessary for operation of the electronic apparatus 100. The memory 240 may be implemented to be non-volatile memory, volatile memory, flash memory, hard disk drive (HDD) or solid state drive (SSD). The memory 240 may be accessed by the processor 210, and reading/recording/revising/removing/renewing of data may be performed by the processor 210.

Further, the memory 240 may store programs and data to constitute various screens to be displayed on the display region of the display 220. For example, the memory 240 may store preference of the above described applications. Further, a form of notice information to be displayed on the display 220 may be stored according to preference level of the applications. The processor 210 may control the operation of determining and displaying a form of the notice information to be displayed on the display according to the preference of corresponding application when a notice of an application is generated.

Figure 17:
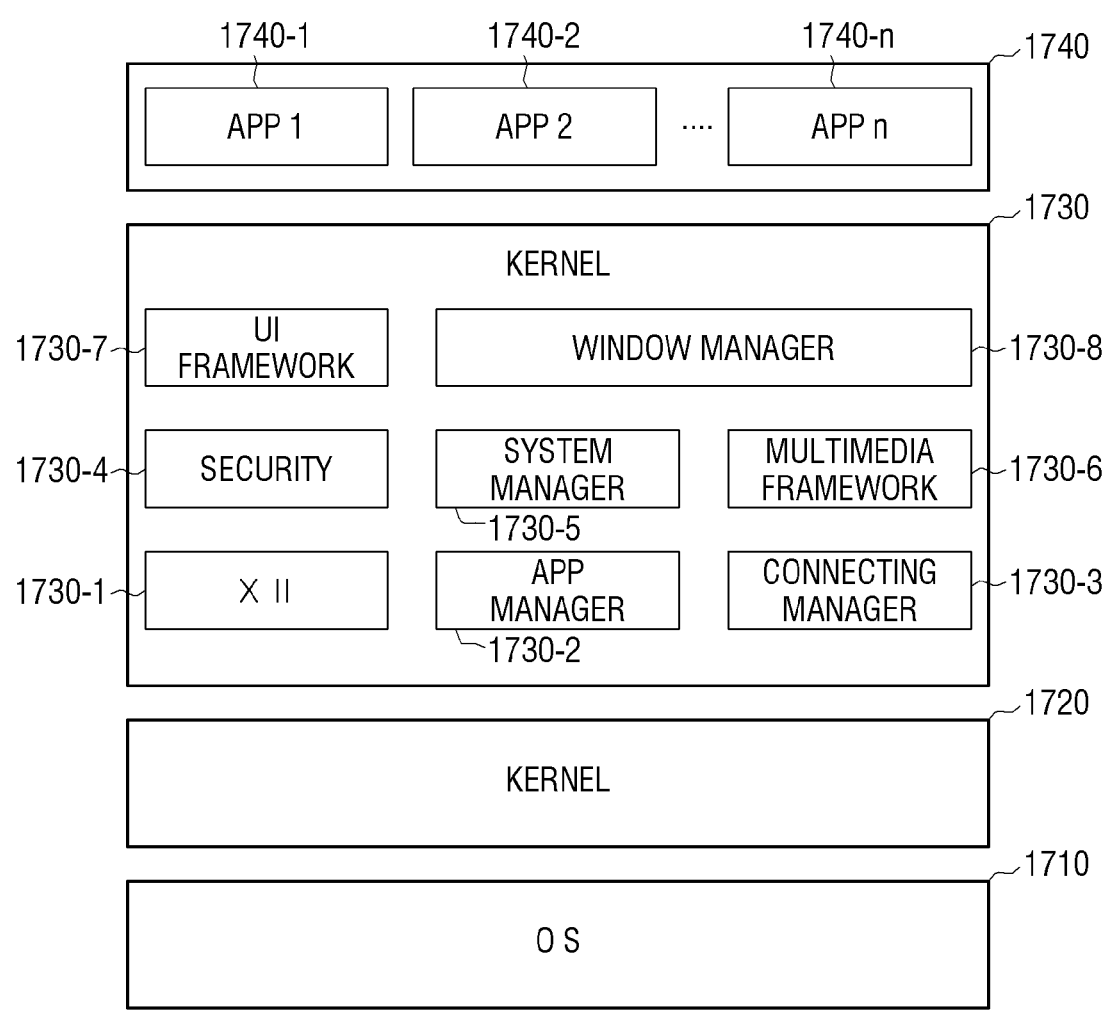
FIG. 17 is a block diagram briefly illustrating structure of software stored in an electronic apparatus according to an embodiment.

FIG. 17 is a block diagram briefly illustrating structure of software stored in the electronic apparatus according to an embodiment.

Following will describe structure of the software stored in the memory 240 by referring to FIG. 17. In FIG. 17, the memory 240 may store the software including OS 1710, kernel 1720, middleware 1730, and application 1740.

OS 1710 (operating system) may perform a function of controlling and managing general operation of hardware. Thus, OS 1710 is class to perform basic functions such as hardware management, memory and security.

The kernel 1720 may play a route role to deliver various signals such as a touch signal sensed in the sensor 230 to the middleware 1730.

The middleware 1730 may include various software modules controlling operation of the electronic apparatus 100. Referring to FIG. 17, the middleware 1730 includes X11 module 1730-1, APP manager 1730-2, connecting manager 1730-3, security module 1730-4, system manager 1730-5, multimedia framework 1730-6, UI framework 1730-7, and window manager 1730-8.

X11 module 1730-1 is module to receive various event signals from various hardware provided in the electronic apparatus 100. Herein, event may be variously set such as event in which a user gesture is sensed, event in which a system alarm is generated, and event in which a specific program is performed or closed.

APP manager 1730-2 is module to manage implementing state of various applications 1740 installed on the memory 240. APP manager 1730-2 may call and implement an application corresponding to the event when an application implementing event is sensed from X11 module 1730-1.

The connecting manager 1730-3 is module to support the wire or the wireless network connection. The connecting manager 1730-3 may include various detailed modules such as DNET module and UPnP module.

The security module 1730-4 is module to support hardware certification, request permission, and secure storage.

The system manager 1730-5 may monitor state of each unit within the electronic apparatus 100, and provide the monitoring result to the other modules. For example, when the electrical power is off, errors occur, or communication connecting state is off, the system manager 1730-5 may provide the monitoring result to UI framework 1730-7, and output a notice message or a notice sound.

The multimedia framework 1730-6 is module to reproduce multimedia contents stored in the electronic apparatus 100 or provided from an external source. The multimedia framework 1730-6 may include player module, camcorder module, and sound processing module. Thereby, the multimedia framework 1730-6 may perform operation of reproducing various multimedia contents, and generating and reproducing screens and sounds.

UI framework 1730-7 may include image compositor module to constitute various UI elements, coordinate compositor module to calculate a coordinate in which UI element will be displayed, rendering module to render the constituted UI element on the calculated coordinate, and 2D/3D UI tool kit to provide tools for constituting UI in 2D or 3D form.

The above described notice information may be generated through UI framework 1730-7. For example, when the system manager 1730-5 monitors state of the electronic apparatus 100 and confirms a problem such as battery amount shortage or communication connecting off, the confirmed problem may be transmitted to UI framework 1730-7. UI framework 1730-7 may create the monitoring result in a notice information form, and display on the display. A notice created in the application may be transmitted to UI framework 1730-7, and UI framework 1730-7 may display the created notice in the above described notice information form on the display.

The window manager 1730-8 may sense a touch event or other inputting events of using a user body or a pen. The window manager 1730-8 may deliver an event signal to UI framework 1730-7 when such event is sensed, and perform corresponding operation to the event.

Besides, various program modules may be stored within the electronic apparatus 100 such as writing module to draw a line according to a dragging track when a user touches or drags the screen and angle calculation module to calculate a pitch angle, a roll angle, and a yaw angle based on the sensor value sensed in the motion sensor 232.

The application module 1740 includes applications 1740-1-1740-*n* to support various functions. For example, the application module 1740 may include program modules to provide various services such as navigation program module, game module, electronic book module, calendar module, and alarm management module. The applications may be set as defaulted, or may be voluntarily installed and used while using. When UI element is selected, the main CPU 214 may implement an application corresponding to the selected UI element by using the application module 1740.

The software structure illustrated in FIG. 17 is merely one of embodiment, and may not be limited hereto. Thus, some units may be removed, modified, or added according to the type or the purpose of the electronic apparatus 100. For example, the memory 240 may be additionally provided with various programs such as sensing module to analyze signals sensed in various sensors, messaging module such as messenger program, text message program, and email program, call info aggregator program module, VoIP module, and web browser module.

According to the various embodiments, a problem can be improved in which an error occurs in the measured value due to the mutual interference when a plurality of light emitters in the electronic apparatus 100 emit a light.

Further, the electronic apparatus 100 may recognize a user approaching and control the transparent display or the mirror display included in the electronic apparatus, which enhancing the user convenience.

The display control method according to the above various embodiments may be implemented to be a program and provided to the display system.

For example, in non-transitory computer readable recording medium storing a program to perform the control method of the electronic apparatus provided with the sensor including the first and second light emitter to respectively emit first and second light and a first light receiver to receive a reflected light by the object positioned in front, the control method may include driving the first and second light emitter such that at least a portion of the first and second light can be emitted to different illumination regions, sensing a distance from the object by measuring a time that at least one of the first and second light is reflected against the object and returned, and controlling the display based on the sensed distance by the object.

Non-transitory computer readable recording medium indicate medium which store data semi-permanently and can be read by devices, not medium storing data temporarily such as register, cache, or memory. Specifically, the above various applications or programs may be stored and provided in non-transitory computer readable recording medium such as CD, DVD, hard disk, Blu-ray disk, USB, memory card, or ROM.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

Although a few embodiments have been shown and described, it would be appreciated by those skilled in the art that changes may be made in these embodiments without departing from the principles and spirit thereof, the scope of which is defined in the claims and their equivalents.

What is claimed is:

1. An electronic apparatus, comprising:
   a display;
   a sensor comprising a first light emitter, a second light emitter, and a light receiver; and
   a processor electrically connected with the display and the sensor, the processor configured to
      control the first light emitter to emit a first light having a first beam angle and the second light emitter to emit a second light having a second beam angle, respectively,
      control the light receiver to receive at least one of the first light or the second light which is reflected off an object,
      obtain a distance to the object based on a time that the at least one of the first light or the second light is emitted and received after being reflected off the object,
      control the display based on the obtained distance, and
      control the first light emitter and second light emitter to emit at least a portion of the first light and at least a portion of the second light toward different illumination regions,
   wherein the first beam angle and the second beam angle are different.

2. The electronic apparatus of claim 1, wherein the processor configured to control the first light emitter and the second light emitter to emit the first light and the second light having at least one of different light emitting time, different light emitting frequencies, and different light emitting wavelengths.

3. The electronic apparatus of claim 2, wherein the light receiver is disposed between the first light emitter and the second light emitter, and the processor controls the first light emitter and the second light emitter to sequentially emit light at different light emitting timings.

4. The electronic apparatus of claim 2, wherein the light receiver is disposed between the first light emitter and the second light emitter, and
   the processor controls the first light emitter and second light emitter to emit lights having different frequencies.

5. The electronic apparatus of claim 2, wherein the light receiver is a first light receiver and the sensor further comprises a second light receiver, the first light and the second light have different wavelengths, and the first light receiver receives the first light reflected off the object and the second light receiver receives the second light reflected off the object.

6. The electronic apparatus of claim 1, wherein a light illumination direction of the first light emitter and a light illumination direction of the second light emitter are different.

7. The electronic apparatus of claim 1, wherein the display comprises a transparent display panel, and while content is being displayed on the transparent display panel, the processor controls a transparency of at least one region of the transparent display panel to be varied, based on the distance between the sensor and the object being less than a predetermined distance.

8. The electronic apparatus of claim 1, wherein the display comprises a mirror display panel, and
   while content is being displayed on the mirror display panel, the processor controls at least one of a size and a position of the content displayed on the mirror display panel to be varied and displayed, based on the distance between the sensor and the object being less than a predetermined distance.

9. A control method for an electronic apparatus having a sensor comprising a first light emitter, a second light emitter and a light receiver, the control method comprising:
   controlling the first light emitter to emit a first light having a first beam angle and the second light emitter to emit a second light having a second beam angle, respectively;
   receiving, by the light receiver, at least one of the first light and the second light which is reflected off an object;
   obtaining a distance to the object based on a time that the at least one of the first light and the second light is emitted and received after being reflected off the object; and
   controlling a display based on the obtained distance from the object,
   wherein the controlling of the first light emitter and the second light emitter comprises controlling the first light emitter and second light emitter to emit at least a portion of the first light and at least a portion of the second light toward different illumination regions, wherein the first beam angle and the second beam angle are different.

10. The control method of claim 9, wherein the controlling of the first light emitter and the second light emitter further comprises controlling the first light emitter and the second light emitter to emit the first light and the second light having at least one of different light emitting time, different light emitting frequencies, and different light emitting wavelengths.

11. The control method of claim 10, wherein the controlling of the first light emitter and the second light emitter further comprises controlling the first light emitter and the second light emitter to sequentially emit the first light and the second light at different light emitting timings.

12. The control method of claim 10, wherein the controlling of the first light emitter and the second light emitter further comprises controlling the first light emitter and the second light emitter to emit the first light and the second light having different frequencies.

13. The control method of claim 10, wherein the light receiver is a first light receiver and the sensor further comprises a second light receiver, the first light and the second light have different wavelengths, and the first light receiver receives the first light reflected off the object and the second light receiver receives the second light reflected off the object.

14. The control method of claim 9, wherein the display comprises a transparent display panel, the control method further comprising:

controlling a transparency of at least one region of the transparent display panel to be varied, based on the distance between the sensor and the object being less than a predetermined distance while content is being displayed on the transparent display.

15. The control method of claim 9, wherein the display comprises a mirror display panel, the control method further comprising:

changing at least one of a size and a position of the content displayed on the mirror display and displaying same, based on the distance between the sensor and the object being less than a preset distance while contents is being displayed on the mirror display.

16. The control method of claim 9, further comprising:

displaying information about an item located behind the display corresponding to a position of a selection by a user on the display.

17. The control method of claim 9, wherein the display comprises a reflective display and, the method further comprises controlling a position of a content responsive to user position of a user in front of the reflective display.

* * * * *